US012645374B2

(12) United States Patent
Noel et al.

(10) Patent No.: US 12,645,374 B2
(45) Date of Patent: Jun. 2, 2026

(54) METHOD AND DEVICE FOR THE CONCEPTION OF A COMPUTATIONAL MEMORY CIRCUIT

(71) Applicant: Commissariat à l'Énergie Atomique et aux Énergies Alternatives, Paris (FR)

(72) Inventors: Jean-Philippe Noel, Grenoble Cedex (FR); Valentin Egloff, Grenoble Cedex (FR); Bastien Giraud, Grenoble Cedex (FR); Antoine Philippe, Grenoble Cedex (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 17/796,841

(22) PCT Filed: Feb. 5, 2021

(86) PCT No.: PCT/EP2021/052769
§ 371 (c)(1),
(2) Date: Aug. 1, 2022

(87) PCT Pub. No.: WO2021/156420
PCT Pub. Date: Aug. 12, 2021

(65) Prior Publication Data
US 2023/0047801 A1     Feb. 16, 2023

(30) Foreign Application Priority Data
Feb. 7, 2020    (FR) ...................................... 2001243

(51) Int. Cl.
*G06F 3/06*          (2006.01)

(52) U.S. Cl.
CPC .......... *G06F 3/0625* (2013.01); *G06F 3/0653* (2013.01); *G06F 3/0673* (2013.01)

(58) Field of Classification Search
None
See application file for complete search history.

(56) References Cited

U.S. PATENT DOCUMENTS

2006/0203581 A1* 9/2006 Joshi ........................ G06F 30/30
                                                        365/201
2009/0144045 A1* 6/2009 Kanade ................... G06F 30/30
                                                        703/21

(Continued)

OTHER PUBLICATIONS

International Search Report and Written Opinion for Internatioal Application No. PCT/EP2021/052769, mailed Jul. 8, 2021.

(Continued)

*Primary Examiner* — Michael Alsip
(74) *Attorney, Agent, or Firm* — Wolf, Greenfield & Sacks, P.C.

(57)          ABSTRACT
A method of circuit conception of a computational memory circuit including a memory having memory cells, the method including: receiving an indication of the memory storage size and an indication of an instruction frequency of the instructions to be executed by the computational memory circuit; evaluating for a plurality of candidate types of memory cells, a number representing an average number of cycles of the memory of the computational memory circuit per instruction to be executed; determining, for each of the plurality of candidate types of memory cells, a minimum operating frequency of the computational memory circuit based on the number N and on the memory storage size; selecting one of the plurality of candidate types of memory cells based on the determined minimum operating frequency; and performing the circuit conception based on the selected type of candidate memory cell.

15 Claims, 16 Drawing Sheets

(56) References Cited

U.S. PATENT DOCUMENTS

| | | |
|---|---|---|
| 2011/0145777 A1 | 6/2011 | Iyer et al. |
| 2015/0169365 A1 | 6/2015 | Gendler et al. |
| 2017/0083341 A1* | 3/2017 | Burger ................ G06F 9/30047 |

OTHER PUBLICATIONS

Efnusheva et al., A Novel Memory-centric Architecture and Organization of Processors and Computers. Proceedings of the 3rd International Conference on Applied Innovations in IT (ICAIIT). Mar. 2015;3(1):47-53.
Elliott et al., Computational RAM: Implementing processors in memory. IEEE Design & Test of Computers. Jan. 1999;16(1):32-41.

* cited by examiner

Fig. 1

| | S-P | D-P | 2-P | |
|---|---|---|---|---|
| | WR RD<br>PORT A | WR RD<br>PORT A | WR RD<br>PORT A | WR<br>PORT A |
| | | WR RD<br>PORT B | RD<br>PORT B | RD<br>PORT B |
| 1-PORT  1RW | ● | | | |
| 2-PORT  2RW | ○ | ● | | |
| 1R1W | ○ | ● | ● | ● |
| 1R1RW | ○ | ● | ● | |
| 4-PORT  4RW | | ○ | | |
| 2R2W | | ○ | ○ | ○ |
| 2R2RW | | ○ | ○ | |

| | | | | | | |
|---|---|---|---|---|---|---|
| 2501 | D | R | B | X | W | 1 OPERAND |
| 2502 | D | B | | 1/X | W | 1 OPERAND (IN REG) |
| 2503 | D | R | R | B | X | W | 2 OPERANDS |
| 2504 | D | R | B | | 1/X | W | 2 OPERANDS (W/1 IN REG) |
| 2505 | D | R | R | X | 1/X | W | 3 OPERANDS (W/1 IN REG) | f_SRAM

SRAM cut

2700 f_DW

Digital Wrapper

Case 1: $f_{SRAM} = 3 \times f_{DW}$ $f_{SRAM} = 3 \times f_{DW}$

Port-A $f_{DW} = f_{inst}$

Decode
Fetch-1
Fetch-2
Execute-1
Execute-2
Write-Back

Case 2: $f_{SRAM} = 2 \times f_{DW}$ $f_{SRAM} = 2 \times f_{DW}$

Port-A
Port-B $f_{DW} = f_{inst}$

Decode
Fetch-1
Fetch-2
Execute-1
Execute-2
Write-Back

Fig. 30

Case 3: $f_{SRAM} = f_{DW}$

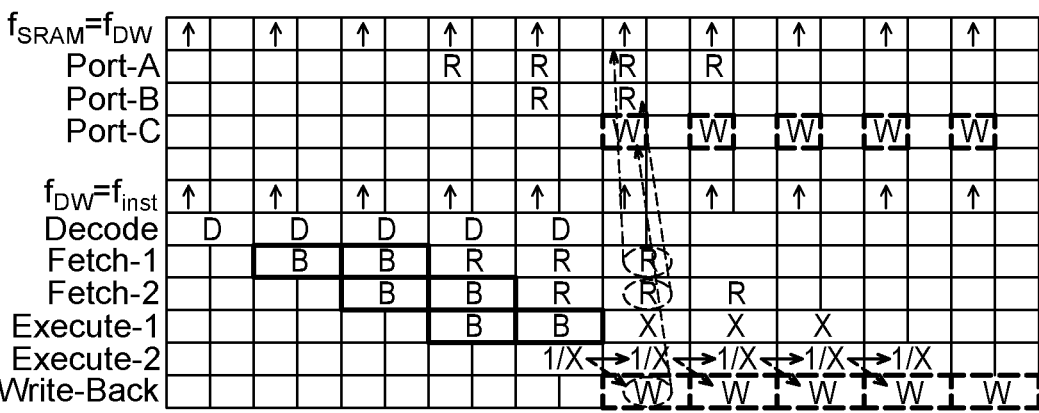

$f_{SRAM} = f_{DW}$
| Port-A | | | | R | R | R | R |
| Port-B | | | | | R | R |
| Port-C | | | | | W | W | W | W | W |

$f_{DW} = f_{inst}$
| Decode | D | D | D | D | D |
| Fetch-1 | | B | B | R | R | (R) |
| Fetch-2 | | | B | B | R | (R) | R |
| Execute-1 | | | | B | B | X | X | X |
| Execute-2 | | | | | 1/X | 1/X | 1/X | 1/X | 1/X |
| Write-Back | | | | | | W | W | W | W | W |

Fig. 31

Case 2: $f_{SRAM} = 2 \times f_{DW}$ $f_{SRAM} = 2 \times f_{DW}$
| Port-A | | | | | R | R | R | W | R | R | R | R |

$f_{DW} = f_{inst}$
| Decode | D | D | D | D | WAIT | D | D |
| Fetch-1 | | B | B | R | R | WAIT | R | R |
| Fetch-2 | | | B | B | R | (R) | WAIT | R | R |
| Execute-1 | | | | B | B | X | X | WAIT | X | X |
| Execute-2 | | | | | 1/X | 1/X | 1/X | 1/X | WAIT | 1/X | 1/X |
| Write-Back | | | | | | W |

Fig. 32

Case 3: $f_{SRAM} = f_{DW}$ $f_{SRAM} = f_{DW}$
| Port-A | | | | R | R | R | R | R |
| Port-B | | | | R | W | | R |

$f_{DW} = f_{inst}$
| Decode | D | D | D | D | WAIT | D | D |
| Fetch-1 | | B | B | R | R | | R | R |
| Fetch-2 | | | B | B | R | (R) | | R | R |
| Execute-1 | | | | B | B | X | X | | X | X |
| Execute-2 | | | | | 1/X | 1/X | 1/X | 1/X | 1/X | 1/X |
| Write-Back | | | | | | W |

METHOD AND DEVICE FOR THE CONCEPTION OF A COMPUTATIONAL MEMORY CIRCUIT

This application is a national stage filing under 35 U.S.C. § 371 of International Patent Application Serial No. PCT/EP2021/052769, filed Feb. 5, 2021, which claims priority to French patent application no. FR2001243, filed on Feb. 7, 2020. The entire contents of these applications are incorporated herein by reference in their entireties.

TECHNICAL FIELD

The present disclosure relates generally to the field of circuit conception, and in particular to a method and device for the conception of a computational memory circuit.

BACKGROUND ART

It has been shown that, in high-performance computing, the energy consumption of the data transfer between the memories and the data processing elements is much higher than the energy consumption of the operation itself. In-Memory Computing (IMC) and Near-Memory Computing (NMC) architectures address this problem by performing some data processing operations within the bitcell matrix (IMC) or at peripheral circuit level (NMC). For example, solutions known in the art as C-SRAM (computational static random access memory) have been proposed. Such solutions can provide advantages in terms of energy efficiency by as much as several tens of TOPS/W (tera operations per second per watt).

Circuit conception tools have been proposed that allow the conception of memory circuits based on standard memory cells, such as SRAM cells. For example, for given memory requirements (storage capacity, surface area, etc.), such tools are able to evaluate, by simulation or other techniques, implementations based on a variety of types of SRAM cells and to generate one or more solutions having a best energy efficiency.

There is, however, a technical difficulty in providing a circuit conception tool for performing circuit conception for circuits that are to comprise IMC or NMC solutions, such as C-SRAM. In particular, there are technical difficulties in terms of silicon qualification and low adaptability to specific application requirements.

SUMMARY OF INVENTION

It is an aim of embodiments of the present disclosure to at least partially address one or more difficulties in the prior art.

According to one aspect, there is provided a method of circuit conception of a computational memory circuit comprising a memory having memory cells, the method comprising: receiving, by a computing device, an indication of a memory storage size of the memory of the computational memory circuit and an indication of an instruction frequency of the instructions to be executed by the computational memory circuit; evaluating, by the computing device for a plurality of candidate types of memory cells for implementing the memory cells of the memory of the computational memory circuit, a number representing an average number of cycles of the computational memory circuit per instruction to be executed by the computational memory circuit, wherein each of the candidate types of memory cells differs from the other candidate types of memory cells in terms of the number of read and/or write operations capable of being performed during a memory access cycle; determining, by the computing device, for each of the plurality of candidate types of memory cells, a minimum operating frequency of the memory of the computational memory circuit based on the number N and on the memory storage size; selecting one of the plurality of candidate types of memory cells based on the determined minimum operating frequency; and performing, by the computing device, the circuit conception based on the selected type of candidate memory cell.

According to one embodiment, the method further comprises, prior to selecting one of the candidate types: determining, by the computing device for each of the plurality of candidate types of memory cells, and for example using a look-up table, a maximum operating frequency of the computational memory circuit, wherein selecting one of the candidate types comprises: selecting, by the computing device, one of the plurality of candidate types of memory cells for which the maximum operating frequency is greater than the minimum operating frequency of the computational memory circuit.

According to one embodiment, the computing device is configured to calculate the minimum operating frequency $f_{SRAM\_min}$ based on the following formula:

$$f_{SRAM\_min} = N * f_{inst}$$

where $f_{inst}$ is the indication of the instruction frequency and N is said number.

According to one embodiment, selecting, by the computing device, one of the plurality of candidate types of memory cells is further based on a determination of the highest performing candidate memory cell, among the plurality of candidate types of memory cells, in terms of operating frequency of the computational memory circuit, surface area of the computational memory circuit and/or power consumption of the computational memory circuit.

According to one embodiment, the method further comprises, prior to determining the minimum operating frequency, performing, by the computing device, a pre-selection phase comprising: determining, by the computing device for each candidate type of an initial set of candidate types of memory cells, a maximum operating frequency of the computational memory circuit; evaluating, by the computing device for each candidate type of the initial set, the average number representing the number of cycles of the computational memory circuit per instruction to be executed by the computational memory circuit; determining, by the computing device, for each candidate type of the initial set, a maximum instruction frequency of the computational memory circuit based on the number N and on the memory storage size; and selecting, by the computing device, the plurality of candidate types from the initial set based on the determined maximum instruction frequencies.

According to one embodiment, the computing device is configured to calculate the maximum instruction frequency $f_{inst\_max}$ based on the following formula:

$$f_{inst\_max} = f_{SRAM\_max} / N$$

where $f_{SRAM\_max}$ is the maximum operating frequency and N is said number.

According to one embodiment, the maximum operating frequency is determined by the computing device based on one or more of: the type of the candidate memory cells; the memory storage size; the number of cuts forming the computational memory circuit.

According to one embodiment, N is evaluated based on a highest instruction length among instructions of an instruction set to be executed by the computational memory circuit.

According to one embodiment, the instruction set consists of instructions having a fixed length equal to said highest instruction length defined, for example, by a 3-operand operation.

According to one embodiment, N is evaluated based on an indication of at least one instruction type to be executed by the computational memory circuit, and/or on an indication of a number and type of operations of each instruction type to be executed by the computational memory circuit.

According to one embodiment, N is further evaluated based on an indication of a relative occurrence distribution of each instruction type to be executed by the computational memory circuit.

According to one embodiment, the plurality of candidate types of memory cells comprises at least some or all of the following static random access memory cell types:

- a 1RW cell type in which at most a single read or write operation can be performed during each memory access cycle;
- a 1R1W cell type in which at most a single read operation and a single write operation can be performed during each memory access cycle;
- a 1R1RW cell type in which at most a single read operation and either a single further read operation, or a single write operation, can be performed during each memory access cycle;
- a 2RW cell type in which at most two operations, each of which is either a read or write, can be performed during each memory access cycle;
- a 2R1W cell type in which at most two read operations and a single write operation can be performed during each memory access cycle;
- a 2R2W cell type in which at most two read operations and two write operations can be performed during each memory access cycle;
- a 2R2RW cell type in which at most two read operations and two further operations, each of which is either a read or a write, can be performed during each memory access cycle; and
- a 4RW cell type in which at most operations, each of which is either a read or a write, can be performed during each memory access cycle.

According to one embodiment, N is evaluated as being: equal to 3 for a first class of the candidate types of memory cells capable of performing a single read or write operation during each memory access cycle; equal to 2 for a second class of the candidate types of memory cells capable of performing more than a single read or write operation, and up to two read or write operations, during each memory access cycle; and equal to 1 for a third class of the candidate types of memory cells capable of performing two read operations and a single write operation during each memory access cycle.

According to one embodiment, performing the circuit conception based on the selected type of candidate memory cell comprises generating, by the computing device, for the selected type of candidate memory cell, one or more digital design files representing an implementation of the computational memory circuit having memory cells of the selected type and one or more processing elements for implementing the at least one operation.

According to a further aspect, there is provided a method of conception and fabrication of a computational memory circuit comprising: the conception of the computational memory circuit according to the above method; and the fabrication of the computational memory circuit based on the one or more digital design files.

According to a further aspect, there is provided a computing device for circuit conception of a computational memory circuit comprising a memory having memory cells, the computing device comprising one or more processors under control of instructions stored in an instruction memory, the computing device being configured to: receive an indication of a memory storage size of the memory of the computational memory circuit and an indication of an instruction frequency of the instructions to be executed by the computational memory circuit; evaluate, for a plurality of candidate types of memory cells for implementing the memory cells of the memory of the computational memory circuit, a number representing an average number of cycles of the computational memory circuit per instruction to be executed by the computational memory circuit, wherein each of the candidate types of memory cells differs from the other candidate types of memory cells in terms of the number of read and/or write operations capable of being performed during a memory access cycle; determine, for each of the plurality of candidate types of memory cells, a minimum operating frequency based on the number N and on the memory storage size; select one of the plurality of candidate types of memory cells based on the determined minimum operating frequency value; and perform the circuit conception based on the selected type of candidate memory cell.

According yet a further aspect, there is provided a computational memory circuit having an input coupled to a system bus, the computation memory circuit comprising: a static random access memory; and a digital wrapper comprising a data processing circuit configured to decode instructions and perform data processing operations on operands, wherein the digital wrapper provides an interface between the system bus input and the static random access memory, and wherein the data processing circuit is configured to execute only instructions that are defined by an instruction set, each instruction of the instruction set being configured to have a same instruction length.

According to yet a further aspect, there is provided a method of circuit conception of a computational memory circuit comprising: receiving, by a computing device, an indication of at least one instruction type to be executed by the computational memory circuit and an indication of a memory storage size of the computational memory circuit; evaluating, by the computing device for a plurality of types of memory cells, a number representing a number of cycles of the computational memory circuit per instruction to be executed by the computational memory circuit, the evaluation being based on the indication of at least one instruction type; determining, by the computing device, for each of the plurality of types of memory cells and based on the number N and on the memory storage size, an operating frequency of the computational memory circuit; and selecting one of the plurality of types of memory cells based on the determined operating frequency of the computational memory circuit.

According to one embodiment, the method further comprises: determining, by the computing device for each of the plurality of types of memory cells, based on the operating frequency of the computational memory circuit, a maximum instruction frequency of the instructions to be executed by the computational memory circuit; and selecting, by the computing device, one of the plurality of types of memory cells having the highest maximum instruction frequency.

According to one embodiment, the method further comprises: receiving, by the computing device, an indication of an instruction frequency of the instructions to be executed by the computational memory circuit; determining, by the computing device for each of the plurality of types of memory cells and based on the indication of the instruction frequency and on the number N, a minimum operating frequency of the computational memory circuit; and selecting one or more of the plurality of types of memory cells for which an operating frequency is greater than the minimum operating frequency of the computational memory circuit.

According to one embodiment, the method further comprises generating, by the computing device, for the selected type of memory cell, one or more design files representing an implementation of the computational memory circuit having the selected type of memory cells and one or more processing elements for implementing the at least one operation.

According to one embodiment, the indication of at least one instruction type comprises an indication of a number of operations of each of the at least one instruction type.

According to one embodiment, the indication of at least one instruction type comprises an indication of a relative occurrence distribution of each instruction type with respect to the overall number of instructions.

According to a further aspect, there is provided a computing device for circuit conception of a computational memory circuit, the computing device comprising one or more processors under control of instructions stored in an instruction memory, the computing device being configured to: receive an indication of at least one operation to be performed by the computational memory circuit and an indication of a memory storage size of the computational memory circuit; determine, for a plurality of types of memory cells, a number representing a number of cycles of the computational memory circuit per instruction to be executed by the computational memory circuit; determine, for each of the plurality of types of memory cells and based on the number N and on the memory storage size, an operating frequency of the computational memory circuit; and select one of the plurality of types of memory cells based on the determined operating frequency of the computational memory circuit.

According to one embodiment, the computing device is further configured to: determine, for each of the plurality of types of memory cells, based on the operating frequency of the computational memory circuit, a maximum instruction frequency of the instructions to be executed by the computational memory circuit; and select, by the computing device, one of the plurality of types of memory cells having the highest maximum instruction frequency.

According to one embodiment, the computing device is further configured to: receive an indication of an instruction frequency of the instructions to be executed by the computational memory circuit; determine, for each of the plurality of types of memory cells and based on the indication of the instruction frequency and on the number N, a minimum operating frequency of the computational memory circuit; and select one or more of the plurality of types of memory cells for which an operating frequency is greater than the minimum operating frequency of the computational memory circuit.

According to one embodiment, the computing device is further configured to generate, for each of the selected types of memory cells, one or more design files representing an implementation of the computational memory circuit having the selected type of memory cells and one or more processing elements for implementing the at least one operation.

BRIEF DESCRIPTION OF DRAWINGS

The foregoing features and advantages, as well as others, will be described in detail in the following description of specific embodiments given by way of illustration and not limitation with reference to the accompanying drawings, in which:

FIG. 1 schematically illustrates computational memory circuits according to example embodiments of the present disclosure;

FIG. 30 is a timing diagram illustrating an example of pipelined execution of instructions having a fixed instruction length using C-SRAM solutions having 2R1W SRAM cells;

FIG. 31 is a timing diagram illustrating an example of pipelined execution instructions having a fixed instruction length using C-SRAM solutions having 1RW SRAM cells, with addition of a wait cycle; and FIG. 32 is a timing diagram illustrating an example of pipelined execution of instructions having a fixed instruction length using C-SRAM solutions having 2RW or 1R1RW SRAM cells.

DESCRIPTION OF EMBODIMENTS

Figures 2, 3, 4:
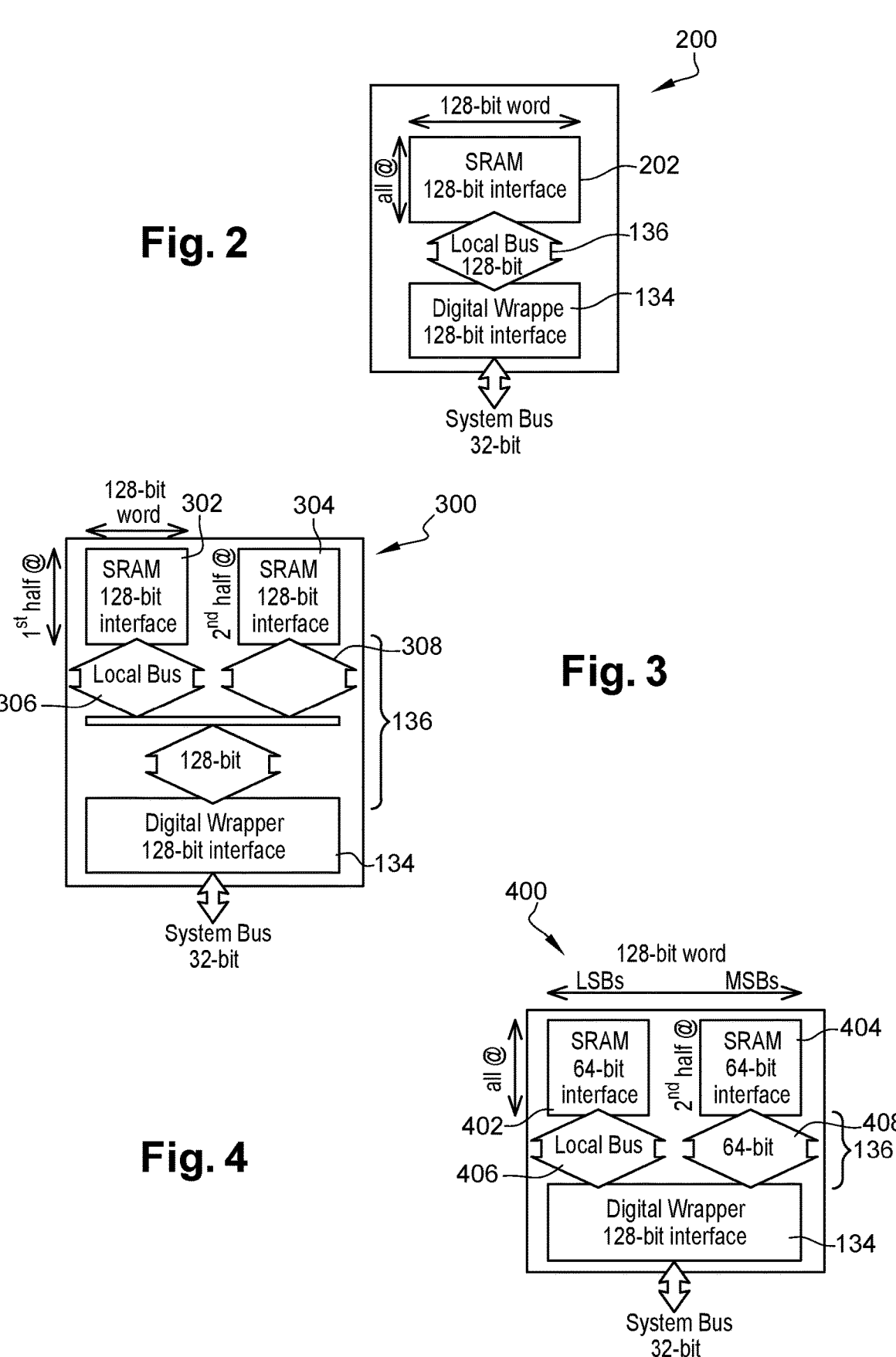
FIG. 2 schematically illustrates a C-SRAM memory cut having a single SRAM partition and a single local memory bus.
FIG. 3 schematically illustrates a C-SRAM memory cut having two full-width SRAM partitions.
FIG. 4 schematically illustrates a C-SRAM memory cut having two half-width SRAM partitions.

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the present description, the term "computational memory circuit" will be used to designate a memory device having computational memory, for example in the form of In-Memory Computing (IMC) or Near-Memory Computing (NMC) capabilities. In either case, the data processing elements are for example present within the memory array before the system bus, in other words before the bus linking the memory device to one or more processors of the system. IMC for example corresponds to a memory device in which data processing elements are located within the memory array before the sense amplifiers of the memory array. NMC for example corresponds to a memory device in which data processing elements are provided between the sense amplifiers and the system bus, in other words processing is performed on digital data read from the memory before the data outputs of the memory device.

Figure 1:
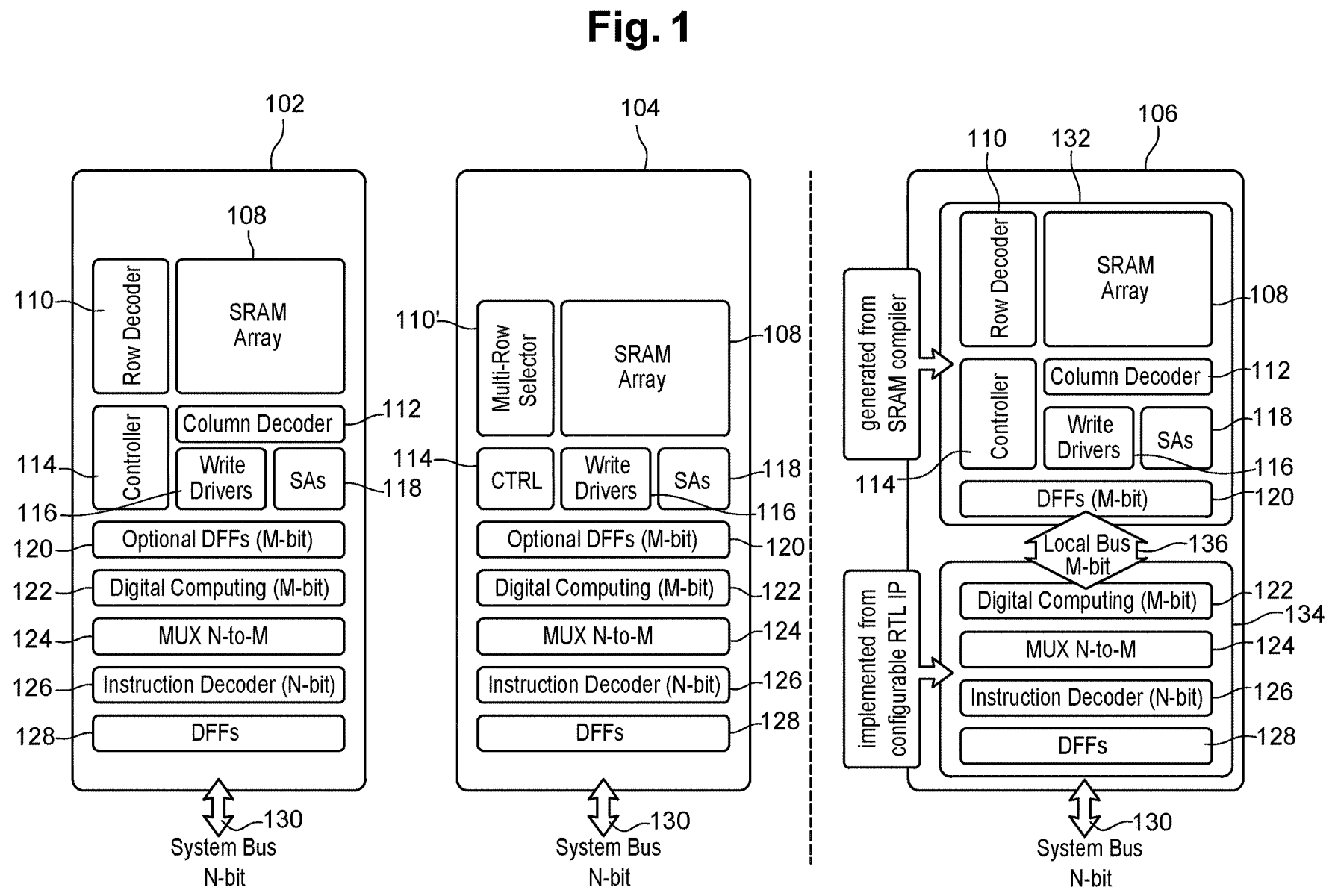

FIG. 1 schematically illustrates computational memory circuits 102, 104 and 106 according to example embodiments of the present disclosure.

The computational memory circuits 102 and 104 correspond to fully customized approaches in which the memory array and computation parts are designed based on the specific application.

The circuit 102 comprises an SRAM array 108, although other types of memory could be used. The array 108 is associated with a row decoder 110, a column decoder 112, and a memory controller 114. Furthermore, write drivers 116 control the writing of data to the memory array 108, and sense amplifiers (SAs) 118 are used to convert signals on the bit lines of the memory array 108 to output signals of the memory array 108. In some embodiments, some M-bit data flip-flops (DFF) 120 may be present for formatting the data read from the memory array 108 into an M-bit format processed by the computation parts, and for allowing M-bit data values to be written to the memory array 108 to be temporarily stored prior to the write operation.

The computation part of the circuits 102 and 104 for example comprises an M-bit digital computing part 122, a multiplexer 124 for performing N to M bit conversion, and vice versa, an N-bit instruction decoder 126, and, in some embodiments, some data flip-flops 128 providing an interface between the computation part and the N-bit system bus 130.

The number of bits N of the system bus 130 is for example smaller than the number of bits M processed by the digital computing circuit 122. For example, in some embodiments, M is an integer multiple of N. In one example, the system bus 130 is a 32-bit bus, and the digital computing circuit 122 comprises processors configured to perform operations on M-bit values, where M is for example equal to 64, 128 or 256.

The computational memory circuit 104 is for example identical to the circuit 102, except that the memory array 108 is further configured to have a customized form and partitioning. The row decoder 110 is for example replaced by a multi-row selector 110' configured to select multiple rows during read and write operations. This permits true IMC to be implemented.

The computational memory circuit 106 corresponds to an automated approach in which the memory part and computational part of the circuit are generated automatically based on the techniques described herein. For example, the automated approach involves separating the conception of the memory part 132, which is for example generated using an SRAM compiler or other type of memory compiler, from the conception of a digital wrapper 134 corresponding to the computation part. The memory part 132 and digital wrapper 134 are for example linked by a local M-bit bus 136. The memory part 132 and the digital wrapper 134 for example have the same elements as the memory and computation parts of the circuit 102.

In some embodiments, the memory part 132 comprises one or more partitions, as will now be described with reference to FIGS. 2 to 5.

FIG. 2 schematically illustrates a C-SRAM memory cut 200, which is for example the circuit 106 of FIG. 1, in the case that it has a single SRAM partition 202, which in the example of FIG. 2 has an IO (input-output) width equal to a 128-bit word, and a single local memory bus 136 coupling the SRAM partition 202 to the digital wrapper 134.

FIG. 3 schematically illustrates a C-SRAM memory cut 300, which is for example the circuit 106 of FIG. 1, in the case that it has two full-width SRAM partitions 302, 304, each partition 302, 304 for example having an IO width equal to a 128-bit word, and a single local memory bus 136. The local bus 136 for example comprises a portion 306 linking the partition 302 to the bus 136, and a portion 308 linking the partition 304 to the bus 136.

FIG. 4 schematically illustrates a C-SRAM memory cut 400, which is for example the circuit 106 of FIG. 1, in the case that it has two half-width SRAM partitions 402, 404. For example, each of the partitions has an IO width equal to half a word length, which in the example of FIG. 4 corresponds to an IO width of 64 bits for a word length of 128 bits. The partition 402 for example comprises the least significant bits (LSBs) of each word, and the partition 404 the most significant bits (MSBs) of each word, such that together the partitions 402, 404 store whole words in each corresponding row. The local bus 136 in the example of FIG. 4 comprises a local bus 406 linking the partition 402 to the digital wrapper 134, and a local bus 408 linking the partition 404 to the digital wrapper 134, where each of the local buses 406, 408 is a 64-bit bus, i.e. equal to the IO width of each partition.

Figure 5:
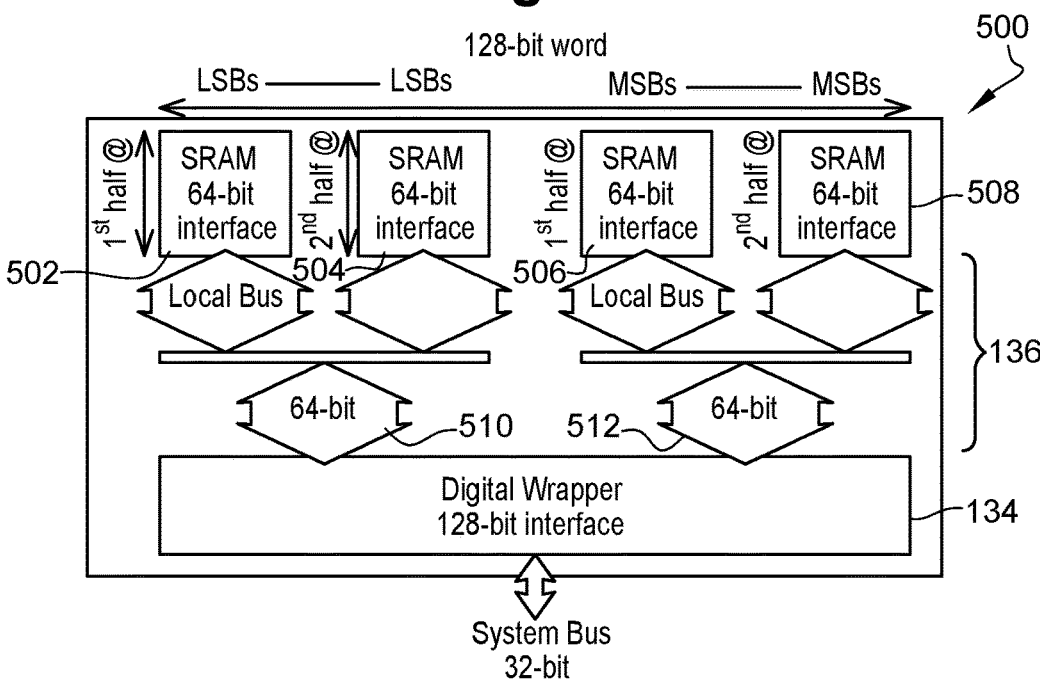
FIG. 5 schematically illustrates a C-SRAM memory cut having four half-width SRAM partitions and two local memory buses.

FIG. 5 schematically illustrates a C-SRAM memory cut 500, which is for example the circuit 106 of FIG. 1, in the case that it has four half-width SRAM partitions 502, 504, 506 and 508. The partitions 502 and 504 for example store LSBs, while the partitions 506 and 508 for example store MSBs, such that together the partitions 502, 506 for example store whole words in each corresponding row, and together the partitions 504 and 508 for example store whole words in each corresponding row. The local bus 136 in the example of FIG. 5 comprises a local bus 510 linking the partitions 502 and 504 to the digital wrapper 134, and a local bus 512 linking the partitions 506 and 508 to the digital wrapper 134.

It is known to implement memory cells of a memory array using a variety of different types of memory cells. For example, in the case of SRAM cells, single-port, dual-port and multi-port cell types are known, and certain techniques, such as a technique known as double pumping, can be used to emulate the operation of a memory having a greater number of ports than the actual number available. In the present disclosure, examples are described based on single-port, dual-port and two-port SRAM cells, each with and without double pumping. However, in alternative embodiments, alternative and/or additional memory cell types could be considered, including both volatile and non-volatile memory cells.

Figure 6:
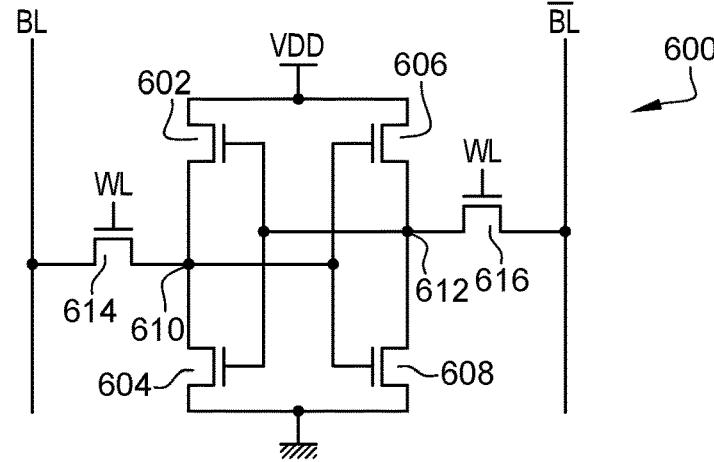
FIG. 6 is a circuit diagram of a single-port SRAM cell.

FIG. 6 is a circuit diagram of a single-port SRAM cell 600 according to an example embodiment. The cell for example comprises a first inverter formed of transistors 602 and 604 coupled in series between the VDD and ground voltage rails, and a second inverter formed of transistors 606 and 608 coupled in series between the VDD and ground voltage rails, the inverters being cross-coupled between bit storage nodes 610, 612. The node 610 is coupled to a bit line BL by a transistor 614 having its gate coupled to a word line WL, and the node 612 is coupled to a bit line $\overline{BL}$ by a transistor 616 having its gate coupled to the word line WL.

Figure 7:
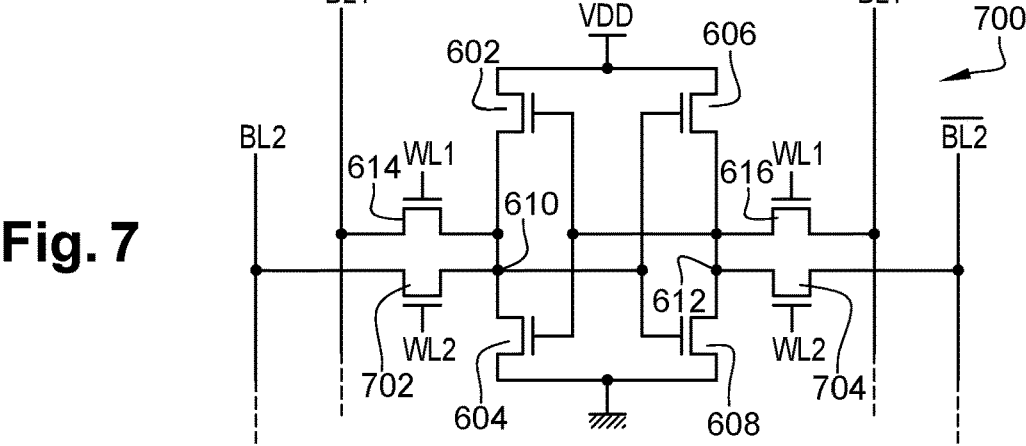
FIG. 7 is a circuit diagram of a dual-port SRAM cell.

FIG. 7 is a circuit diagram of a dual-port SRAM cell 700 according to an example embodiment of the present disclosure. The cell 700 is for example similar to the cell 600 of FIG. 6, and like features have been labelled with like reference numerals and will not be described again in detail. In the memory cell 700, the transistors 614, 616 have their gates coupled to a word line WL1, and respectively couple the storage nodes 610, 612 to bit lines BL1 and $\overline{BL1}$. The memory cell 700 additionally comprises, with respect to the memory cell 600 of FIG. 6, a further transistor 702 coupling the storage node 610 to a further bit line BL2, and a further transistor 704 coupling the storage node 612 to a further bit line $\overline{BL2}$.

Figures 8, 9:
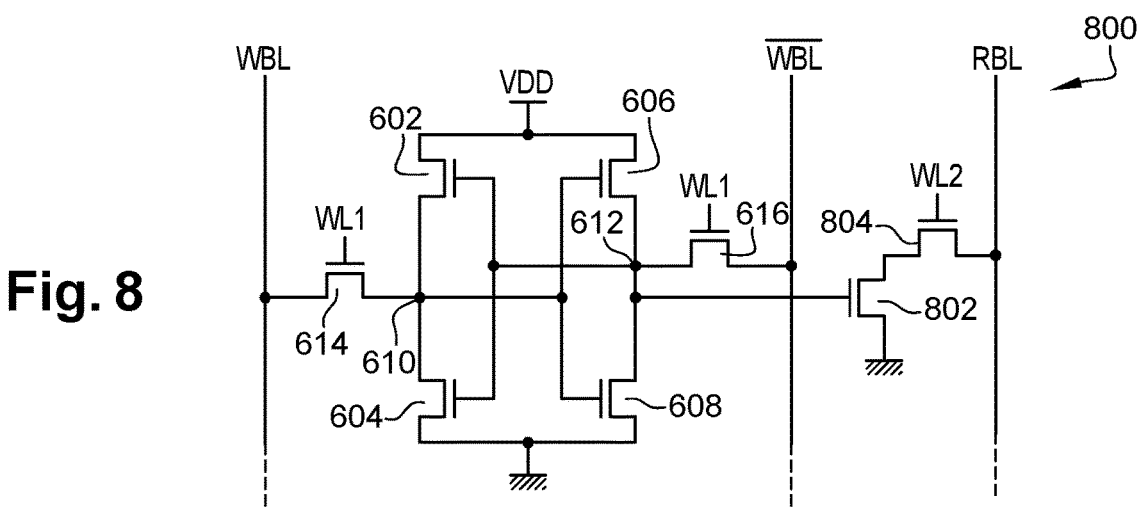
FIG. 8 is a circuit diagram of a two-port SRAM cell.
FIG. 9 is a table representing read and write capabilities of single-port, dual-port and two-port SRAM cells, as well as their double pumping equivalents.

FIG. 8 is a circuit diagram of a two-port SRAM cell 800 according to an example embodiment of the present disclosure. The cell 800 is for example similar to the cell 600 of FIG. 6, and like features have been labelled with like reference numerals and will not be described again in detail. In the memory cell 800, the transistors 614, 616 have their gates coupled to a word line WL1, and respectively couple the storage nodes 610, 612 to bit lines WBL and $\overline{WBL}$. With respect to the memory cell 600, the memory cell 800 further comprises transistors 802 and 804 coupled between the ground rail and a further bit line RBL. The transistor 802 for example has its gate coupled to the storage node 612, and the transistor 804 for example has its gate coupled to a further word line WL2.

The memory cells 600, 700 and 800 for example permit a variety of access possibilities during each memory cycle, as will now be described in more detail with reference to FIG. 9.

FIG. 9 is a table representing read and write capabilities of single-port (S-P), dual-port (D-P) and two-port (2-P) SRAM cells. In this table, solid dots represent implementations not using double pumping, whereas hollow dots represent implementations that do use double pumping.

Double pumping is a technique in which the memory array includes an internal clock having a faster clock frequency, enabling, within a given memory cycle, two memory accesses to be completed. For example, double pumping is described in more detail in the publication by G. S. Ditlow et al. entitled "A 4R2W Register File for 2.3 GHz Wire-Speed POWER Processor with Double-Pumped Write Operation", ISSCC, pp. 256-257, 2011, the contents of which is hereby incorporated by reference to the extent permitted by the law.

Considering first the case of the single-port (S-P) memory cell 600, without using double pumping, a single memory cell 600 of a column can be read from once or written to once during a memory access cycle, as represented by the characters "1RW" (1-PORT). Furthermore, using double pumping, it becomes possible to perform operations equivalent to having two ports (2-PORT). In particular, performing two read or two write accesses, or one read access and one write access, becomes possible, as represented by characters "2RW" in the table. It is also possible to perform a single read access and a single write access, as represented by the characters "1R1W", or to perform a single read, and a further single read or write access, as represented by the characters "1R1RW".

In the case of the dual-port memory cell 700, it becomes possible, during a memory access cycle and without using double pumping, to perform two memory access operations to two different memory cells of each column. Thus, the access types 2RW, 1R1W and 1R1RW are possible. Furthermore, using double pumping, it becomes possible to perform operations equivalent to having four ports (4-PORT). In particular, performing four read or write accesses becomes possible, as represented by characters "4RW" in the table. It is also possible to perform two read accesses and two write accesses, as represented by the characters "2R2W", or to perform two read accesses, and a further two read or write accesses, as represented by the characters "2R2RW".

In the case of the two-port memory cell 800, it is possible, during a memory access cycle and without using double pumping, to perform a single read access and a single write access (1R1W). Furthermore, in the case that the bit lines WBL and $\overline{WBL}$ are not reserved for write operations, it is possible to perform a single read via the bit line RBL, and a further single read or write access (1R1RW) via the bit lines WBL and $\overline{WBL}$. Furthermore, using double pumping, it becomes possible to two read accesses and two write accesses (2R2W), or, in the case that the bit lines WBL and $\overline{WBL}$ are not reserved for write operations, to perform two read accesses, and a further two read or write accesses (2R2RW).

Figure 10:
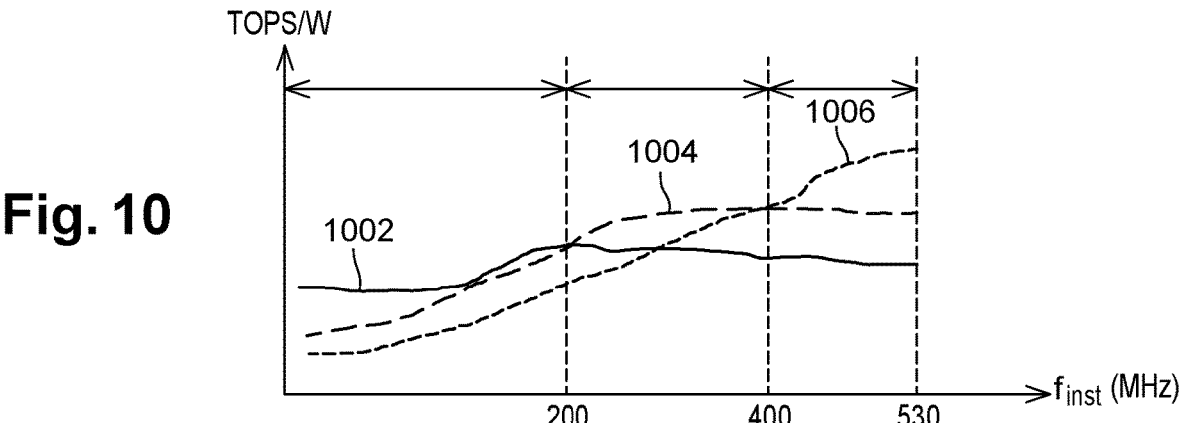
FIG. 10 is a graph representing energy consumption as a function of instruction frequency of C-SRAM solutions based on different SRAM types according to an example embodiment of the present disclosure.

FIG. 10 is a graph representing energy efficiency, in TOPS/W, as a function of instruction frequency of C-SRAM solutions based on different SRAM types according to an example embodiment of the present disclosure.

A solid curve 1002 in FIG. 10 represents the case of a memory cell of the 1RW or 1R1W memory type, a dashed curve 1004 represents the case of a 2RW or 1R1RW memory type, and a dotted curve 1006 represents the case of a 4RW or 2R2RW memory type.

It can be seen that, for lower instruction frequencies $f_{inst}$, for example up to around 200 MHz, the most energy efficient solution is a 1RW or 1R1W solution. For intermediate instruction frequencies $f_{inst}$, for example from around 200 MHz to around 400 MHz, the most energy efficient solution is a 2RW or 1R1RW solution. For higher instruction frequencies $f_{inst}$, for example frequencies above around 500 MHz (FIG. 10 illustrates instruction frequencies of up to 530 MHz), the most energy efficient solution is a 4RW or 2R2RW solution.

Thus, it can be seen from FIG. 10 that the best energy efficiency is determined by both the frequency, and the number of available memory ports.

Figure 11:
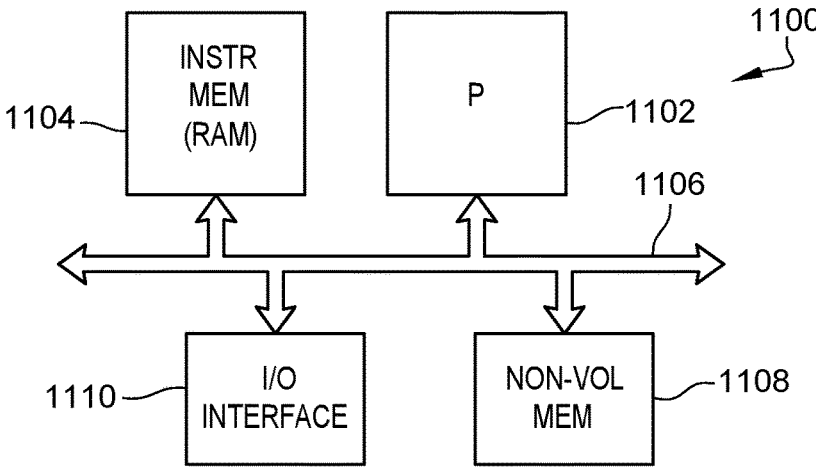
FIG. 11 schematically illustrates a computing device configured to perform circuit conception of a computational memory according to an example embodiment of the present disclosure.

FIG. 11 schematically illustrates a computing device 1100 configured to perform circuit conception of a computational memory according to an example embodiment. The computing device 1100 for example comprises a processing device (P) 1102 comprising one or more processors under control of instructions stored in an instruction memory (INSTR MEM (RAM)) 1104. The instruction memory 1104 is for example a RAM. The processing device 1102 and memory 1104 for example communicate via a system bus 1106. Furthermore, in some embodiments, the computing device 1100 comprises, also coupled to the system bus 1106, a non-volatile memory (NON-VOL MEM) 1108, and an input/output interface (I/O INTERFACE) 1110.

Figure 12:
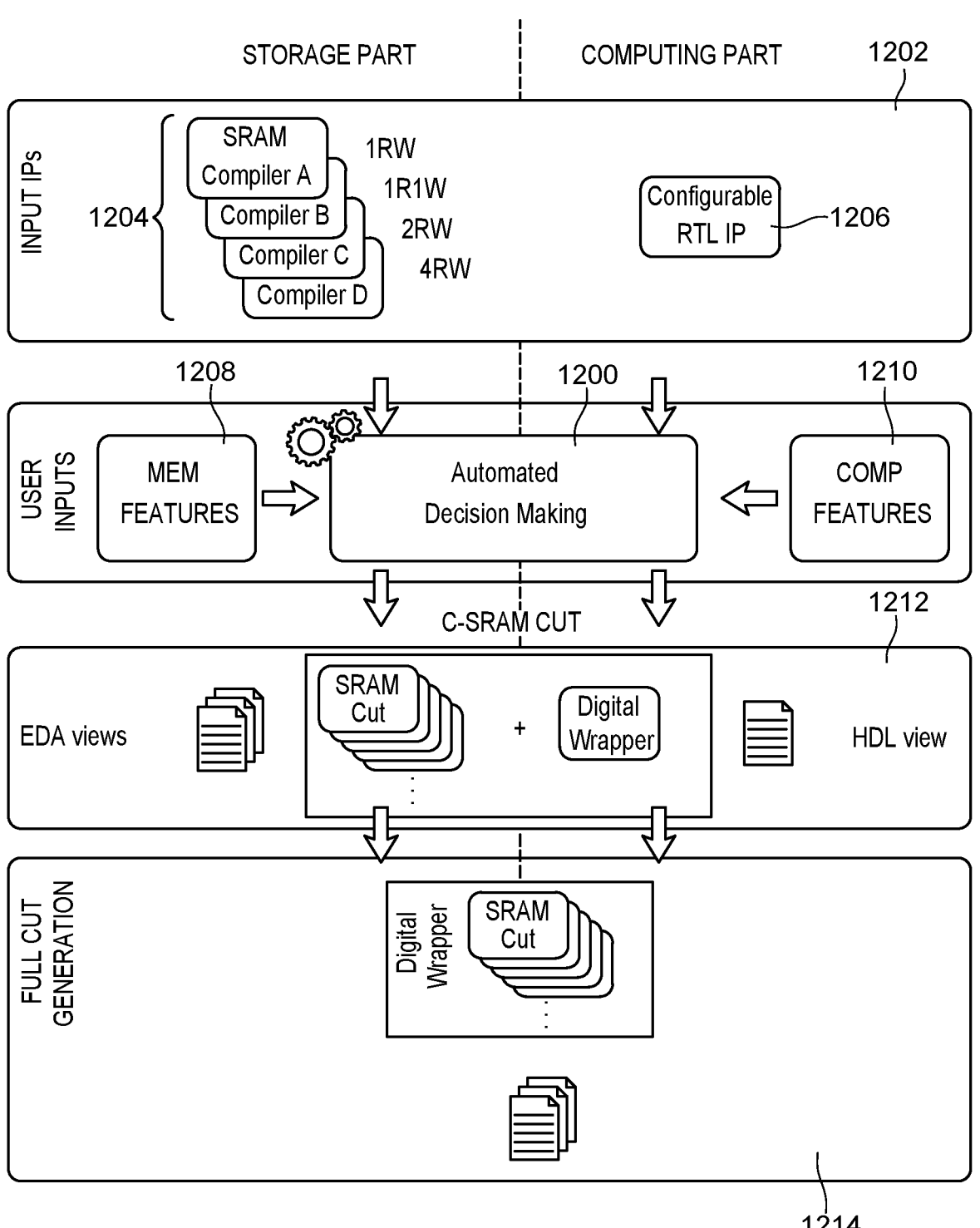
FIG. 12 is a flow diagram representing operations in a method of circuit conception of a computational memory according to an example embodiment of the present disclosure.

FIG. 12 is a flow diagram representing operations in a method of circuit conception according to an example embodiment of the present disclosure. The method of FIG. 12 is for example implemented by the computing device 1100 of FIG. 11. For example, the processing device 1102 is configured to implement this method under control of the instructions stored in the instruction memory 1104.

The method of FIG. 12 is based around an automated decision making function 1200, which for example receives several circuit design files (INPUT IPs) 1202 as inputs.

For example, these inputs 1202 include design files related to the memory storage part of the computational memory. These design files are for example in the form of CAD (computer-aided design) views generated by one or more SRAM compilers 1204. In the example of FIG. 12, there is an SRAM compiler A based on a 1RW memory, an SRAM compiler B based on a 1R1W memory, an SRAM compiler C based on a 2RW memory, and an SRAM compiler D based on a 4RW memory.

The inputs 1202 also for example include design files 1206 for implementing the digital wrapper. For example, these design files 1206 comprise HDL (hardware description language) views of the digital wrapper, and are for example in the form of a configurable RTL (register-transfer language) IP (intellectual property) design. For example, these design files include all available operators for the computational part of the computational memory, which may include arithmetic operators such as add (ADD), subtract (SUB), multiply (MUL), divide (DIV), MAC (multiply and accumulate), etc., logical operators such as AND, OR, XOR, etc., or other types of operations such as shift (SHIFT), increment (INC), or decrement (DEC).

The automated decision making function 1200 also for example receives user inputs (USER INPUTS). These may include inputs related to memory features (MEM FEATURES) 1208, such as word size, the number of words, etc., and inputs relating to features (COMP FEATURES) 1210 of the computation to be performed, such as the operations to be performed, the instruction frequency, and in some cases the instruction occurrence distribution, in other words the percentage that each instruction is likely to occur with respect to the total number of instructions to be executed.

Based on the inputs, the automated decision making function 1200 for example generates a C-SRAM cut (C-SRAM CUT) corresponding to the selection of one of the SRAM compilers. Furthermore, the automated decision making function 1200 for example generates a parametrized design file of the digital wrapper, defining for example a selected subset of the available operations to be implemented in the computational part. The parametrized design file is for example in the form of an HDL view.

The digital wrapper and memory storage parts of the C-SRAM cut are for example generated in an operation 1212. For example, this involves generating one or more design files representing EDA (Electronic Design Automation) views of the selected SRAM compiler, with a required number of cuts. Furthermore, the parametrized design file is for example processed in order to generate an HDL view.

Then, in an operation (FULL CUT GENERATION) 1214, the digital wrapper and SRAM cuts are for example combined to generate one or more assembled C-SRAM design files, corresponding for example to EDA views of the C-SRAM that are ready to be used. In some embodiments, a computational memory is then fabricated based on the one or more design files representing the assembled memory storage part and computational part.

Figure 13:
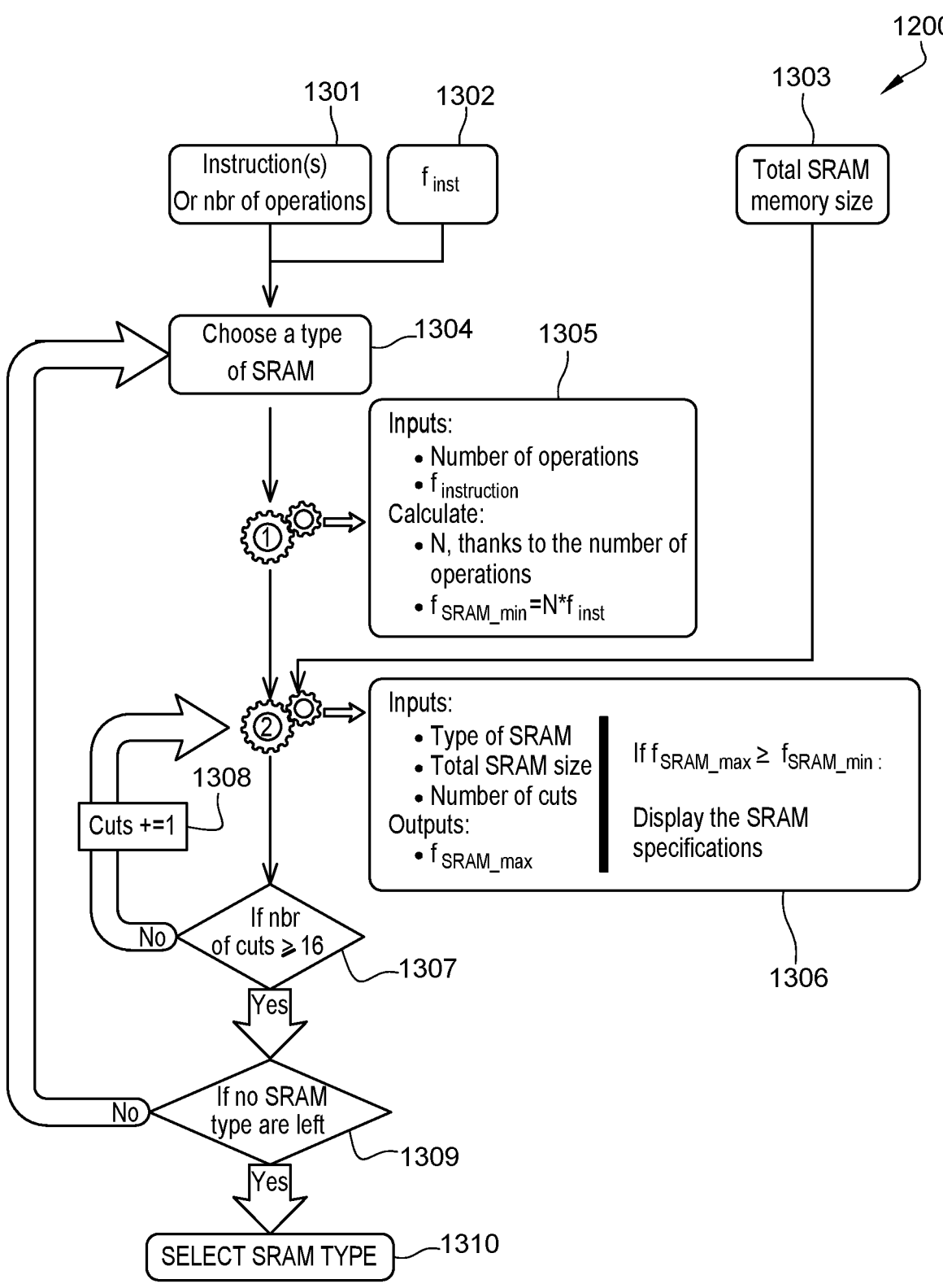
FIG. 13 is a flow diagram illustrating an automated decision making function of the method of FIG. 12 in more detail according to an example embodiment of the present disclosure.

FIG. 13 is a flow diagram illustrating the automated decision making function of the method of FIG. 12 in more detail according to an example embodiment.

The example of FIG. 13 is based on user inputs indicating the instructions to be executed by the computational part, and/or the number of operations per instruction. The instruction frequency $f_{inst}$ 1302 is also for example provided as a user input, as well as the total SRAM size 1303.

In an operation 1304, a candidate SRAM cell type is for example chosen. For example, each of the available SRAM types is selected in turn during the method, and in the operation 1304 an SRAM type not yet processed is chosen. The available SRAM types correspond for example to those for which a corresponding SRAM compiler 1204 of FIG. 12 is available.

In an operation 1305, an evaluation is made of the number N representing a number of cycles of the computational memory circuit per instruction to be executed by the computational memory circuit. Cycles of the computation memory circuit correspond to the cycles in which each operation is performed on one or more operands, and also the memory access cycles, in other words the cycles during which data values are read and/or written to the SRAM portion of the computational memory circuit. In some embodiments, the number N is an average number of cycles of the computational memory circuit per instruction to be executed by the computational memory circuit.

In some embodiments, the number N is retrieved using a lookup table storing precalculated values of N for each of the types of memory cells. In other embodiments, the number N could be determined by a simulation of the instruction execution based on each type of memory cell, and in particular based on the permitted number of read and/or write operations to or from the SRAM during each cycle of the computational memory circuit.

This number N for example permits a minimum SRAM frequency $f_{SRAM\_min}$ to be calculated, where:

$$f_{SRAM\_min}=N*f_{inst}$$

The average number N of cycles of the computational memory circuit per instruction to be executed by the computational memory circuit will depend on the number of operands of the instructions, and also on the memory type, as some memory types will enable greater parallel operation than others. It will also depend on the possibility for parallel operation by the computation part.

In some embodiments, the calculation is based on a worst-case instruction type, in other words based on the maximum number of operating cycles of the computational memory circuit among the instructions to be executed. Furthermore, in some embodiments the instructions of the instruction set to be executed by the computational memory circuit are configured to all have the same length, in other words to each be executed over the same number of cycles corresponding to the worst-case instruction length. For example, if an instruction set has one or more instructions having the highest number of cycles (i.e. the worst-case instruction length) among the instructions of the instruction set, one or more idle cycles are for example added to the other instructions of the instruction set in order to bring all of the instructions to this worst-case instruction length. In such a case, the average number N of cycles is equal to the worst-case instruction length. The worst-case instruction length is for example determined based on overall instruction length, i.e. the total number of cycles of each instruction, or based on the number of memory access cycles of each instruction. Such a worst-case evaluation is described in more detail below with reference to FIGS. 25 to 32.

In other cases, described in more detail below with reference to FIGS. 14 to 24, the calculation is based on the actual instruction type(s) to be executed, and/or on the instruction occurrence distribution.

For example, the following table provides a typical number of cycles associated with certain operations defined above:

TABLE 1

| Operation | Number of Cycles |
|---|---|
| AND | 5 |
| OR | 5 |
| XOR | 5 |
| ADD | 5 |
| SUB | 5 |
| SHIFT | 4 |
| INC | 4 |
| DEC | 4 |
| MAC | 6 |

Some examples of the calculation of the average number N of cycles of the computational memory circuit per instruction to be executed will now be described with reference to FIGS. 14 to 24.

Figure 14:
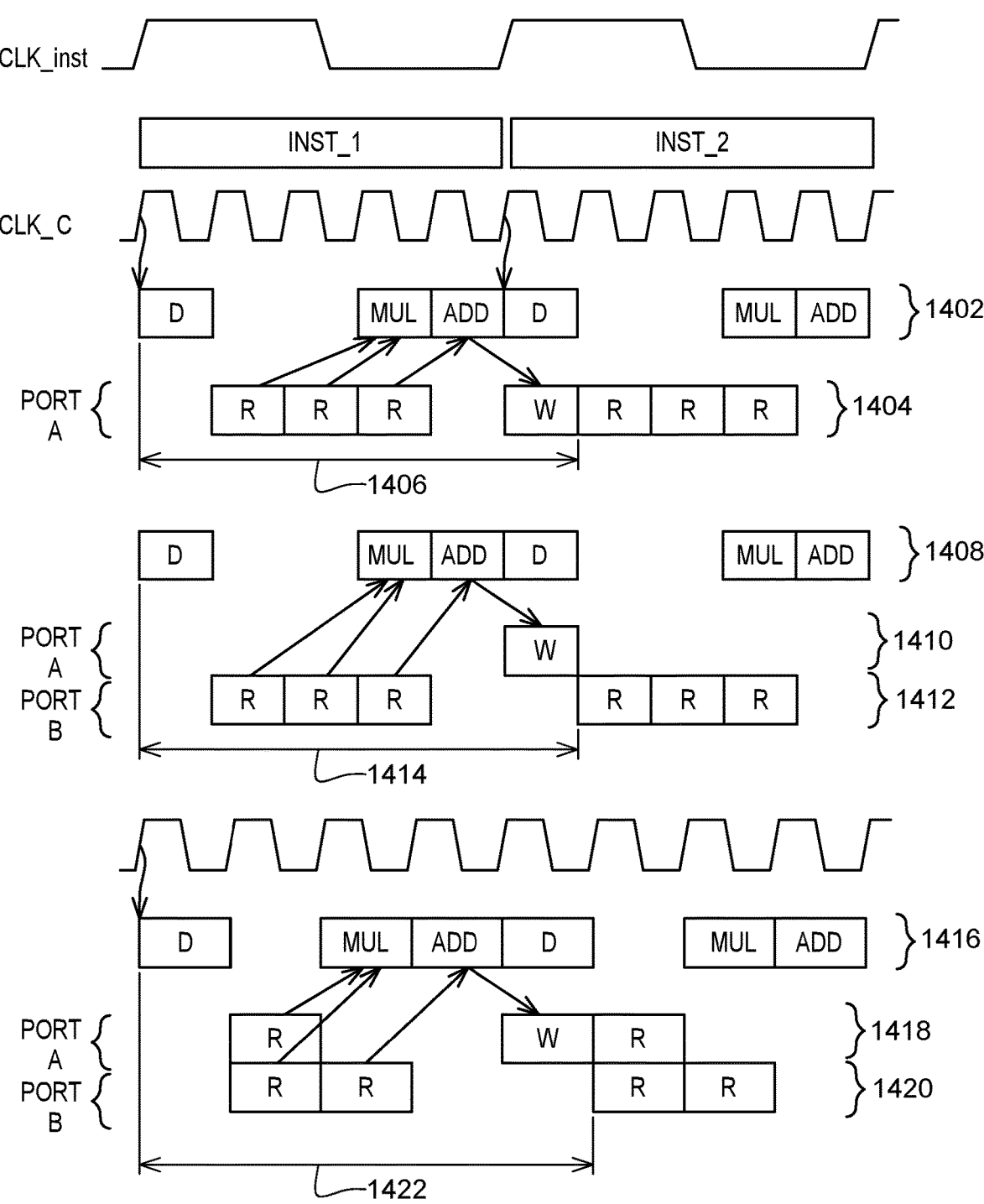
FIG. 14 is a timing diagram illustrating an example of execution of a MAC (multiply and accumulate) function using C-SRAM solutions having 1RW, 1R1W and 2RW or 1R1RW SRAM cells.
Figure 15:
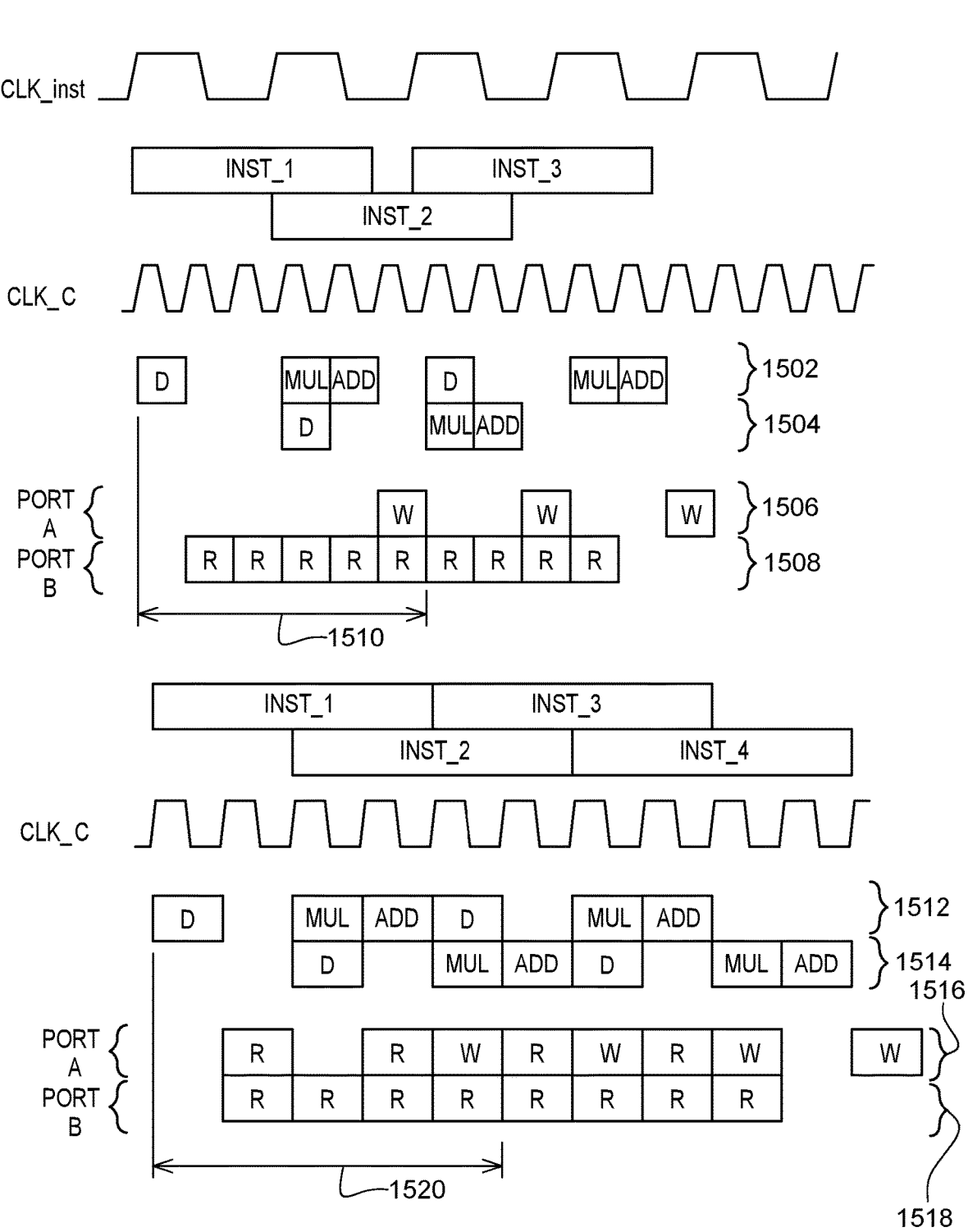
FIG. 15 is a timing diagram illustrating an example of execution of a MAC function using C-SRAM solutions having 1R1W and 2RW or 1R1RW SRAM cells.
Figure 16:
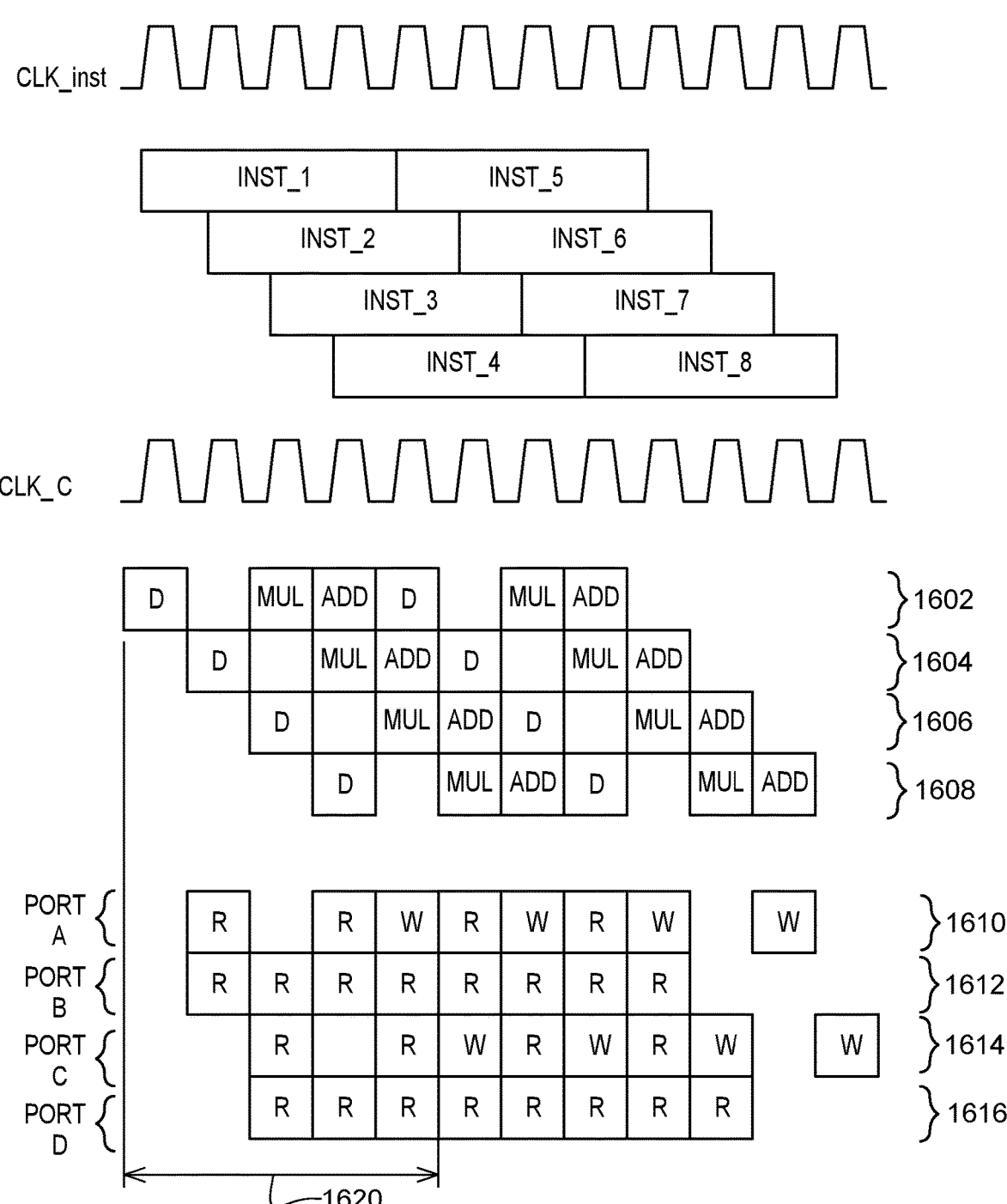
FIG. 16 is a timing diagram illustrating an example of execution of a MAC function using C-SRAM solutions having 4RW or 2R2RW SRAM cells.

In FIGS. 14 to 16, the letter "D" represents an instruction decode operation, the letters "MUL" a multiplication operation, the letters "ADD" an addition, the letter "R" a read operation, and the letter "W" a write operation.

FIG. 14 is a timing diagram illustrating an example of execution of a MAC (multiply and accumulate) function using C-SRAM solutions having 1RW, 1R1W and 2RW or 1R1RW SRAM cells.

An example of the instruction clock signal CLK_inst is shown at the top of the figure, and two MAC instructions INST_1 and INST_2 are represented.

In a first example of FIG. 14, a 1RW SRAM cell is used. In this case, the frequency $f_{SRAM}$ of the SRAM clock CLK_C is five times the frequency $f_{inst}$ of the clock CLK_inst. A row 1402 in FIG. 14 represents the instruction decoding and computing portion of the C-SRAM, and a row 1404 represents memory accesses via the single port PORT A of the SRAM. It can be seen that, in the first example, during an instruction cycle, the first computation period involves an instruction decode operation, the second and third computation periods involve read operations from the SRAM, the fourth computation period involves a multiplication of the two read values, as well as a read operation of another value, and the fifth computation period involves the addition of the result of the multiplication and the new value read from memory. The result is written to memory during the first computation period of the subsequent instruction cycle. Thus, the total operation time 1406 is equal to six periods of the clock CLK_C.

FIG. 14 also illustrates a second example based on a 1R1W SRAM. In this case, N is still equal to five. A row 1408 in FIG. 14 represents the instruction decoding and computing portion of the C-SRAM, a row 1410 represents memory accesses via the write port PORT A of the memory, and a row 1412 represents memory accesses via the read port PORT B of the memory. As shown by rows 1408, 1410 and 1412 of FIG. 14, the only difference with respect to the first example is that the write is performed via another port. The total operation time 1414 remains equal to six periods of the clock CLK_C.

FIG. 14 also illustrates a third example based on a 2RW or 1R1RW SRAM. In this case, N is reduced to 4, and the clock CLK_C is thus redrawn for this value of N. A row 1416 in FIG. 14 represents the instruction decoding and computing portion of the C-SRAM, a row 1418 represents memory accesses via the port PORT A of the SRAM, and a row 1412 represents memory accesses via the port PORT B of the memory. As shown by rows 1416, 1418 and 1420, it is now possible to perform the two initial read accesses in a single cycle, thereby economizing one computation period. The total operation time 1422 is also reduced to five periods of the clock CLK_C.

FIG. 15 is a timing diagram illustrating an example of execution of a MAC function using C-SRAM solutions having 1R1W and 2RW or 1R1RW SRAM cells. In the example of FIG. 15, pipelining is used in the instruction decoding and computing portion.

A first example of FIG. 15 is based on a 1R1W SRAM type and N is equal to 3. A row 1502 in FIG. 15 represents a first pipeline stage of the instruction decoding and computing portion of the C-SRAM, a row 1504 represents a second pipeline stage of the instruction decoding and computing portion of the C-SRAM, a row 1506 represents memory accesses via the port PORT A of the SRAM, and a row 1508 represents memory accesses via the port PORT B of the memory. As illustrated, in a first computation period, a first instruction is decoded in the first pipeline stage. In second and third computation periods, read accesses are performed via port PORT B. In the fourth computation period, the first pipeline stage performs a multiplication, the second pipeline stage performs a decoding of a second instruction, and a read access is performed via port PORT B. In the fifth computation period, the first pipeline stage performs an addition and a read access is performed via port PORT B. In the sixth computation period, write and read accesses are performed via ports PORT A and PORT B respectively. In the seventh computation period, a third instruction is decoded in the first pipeline stage, a multiplication is performed in the second pipeline stage, and a read access is performed via port PORT B. In the eighth computation period, an addition is performed by the second pipeline stage and a read access is performed via port PORT B. In the ninth computation period, write and read accesses are performed via ports PORT A and PORT B respectively. In the tenth computation period, a multiplication is performed by the first pipeline stage, and a read access is performed via port PORT B. In an eleventh computation period, an addition is performed by the first pipeline stage, and in the twelfth computation period, a write access is performed via the port PORT A. In this example, the total operation time 1510 is equal to six periods of the clock CLK_C.

FIG. 15 also illustrates a second example based on a 2RW or 1R1RW SRAM type. A row 1512 in FIG. 15 represents a first pipeline stage of the instruction decoding and computing portion of the C-SRAM, a row 1514 represents a second pipeline stage of the instruction decoding and computing portion of the C-SRAM, a row 1516 represents memory accesses via the port PORT A of the SRAM, and a row 1518 represents memory accesses via the port PORT B of the memory. As shown by the rows 1512 to 1518, in this case N is equal to 2, as it becomes possible to perform the pairs of read accesses in parallel rather than in series. In this example, the total operation time 1520 is equal to five periods of the clock CLK_C.

FIG. 16 is a timing diagram illustrating an example of execution of a MAC function using C-SRAM solutions having 4RW or 2R2RW SRAM cells. In this example, N is equal to 1, in other words $f_{SRAM}$ is equal to $f_{inst}$. Furthermore, in this example, there are four pipeline stages in the instruction decoding and computing portion of the C-SRAM. A row 1602 in FIG. 16 represents a first pipeline stage of the instruction decoding and computing portion of the C-SRAM, a row 1604 represents a second pipeline stage of the instruction decoding and computing portion of the C-SRAM, a row 1606 represents a third pipeline stage of the instruction decoding and computing portion of the C-SRAM, a row 1608 represents a fourth pipeline stage of the instruction decoding and computing portion of the C-SRAM, a row 1610 represents memory accesses via the port PORT A of the SRAM, and a row 1612 represents memory accesses via the port PORT B of the memory, a row 1614 represents memory accesses via the port PORT C of the memory and a row 1616 represents memory accesses via the port PORT D of the memory. In this example, the total operation time 1620 is equal to five periods of the clock CLK_C.

FIGS. 17 to 24 are timing diagrams similar to FIGS. 14 to 16, but for ease of illustration show only an upwards arrow to represent significant edges of the instruction clock CLK_inst, and do not shown in detail the read and write accesses that are performed. Whereas the examples of FIGS. 14 to 16 illustrate cases in which there is a single operation type, which is a MAC operation, in the example of FIGS. 17 to 24, there are three operation types, each having a different number of operands.

In FIGS. 17 to 24, the character "D" designates a decode operation, the character "X" designates a function applied to one or more operands, the character "1" designates a single read access, the character "2" designates two read accesses, and the character "W" designates a write access.

Figures 17, 18, 19:
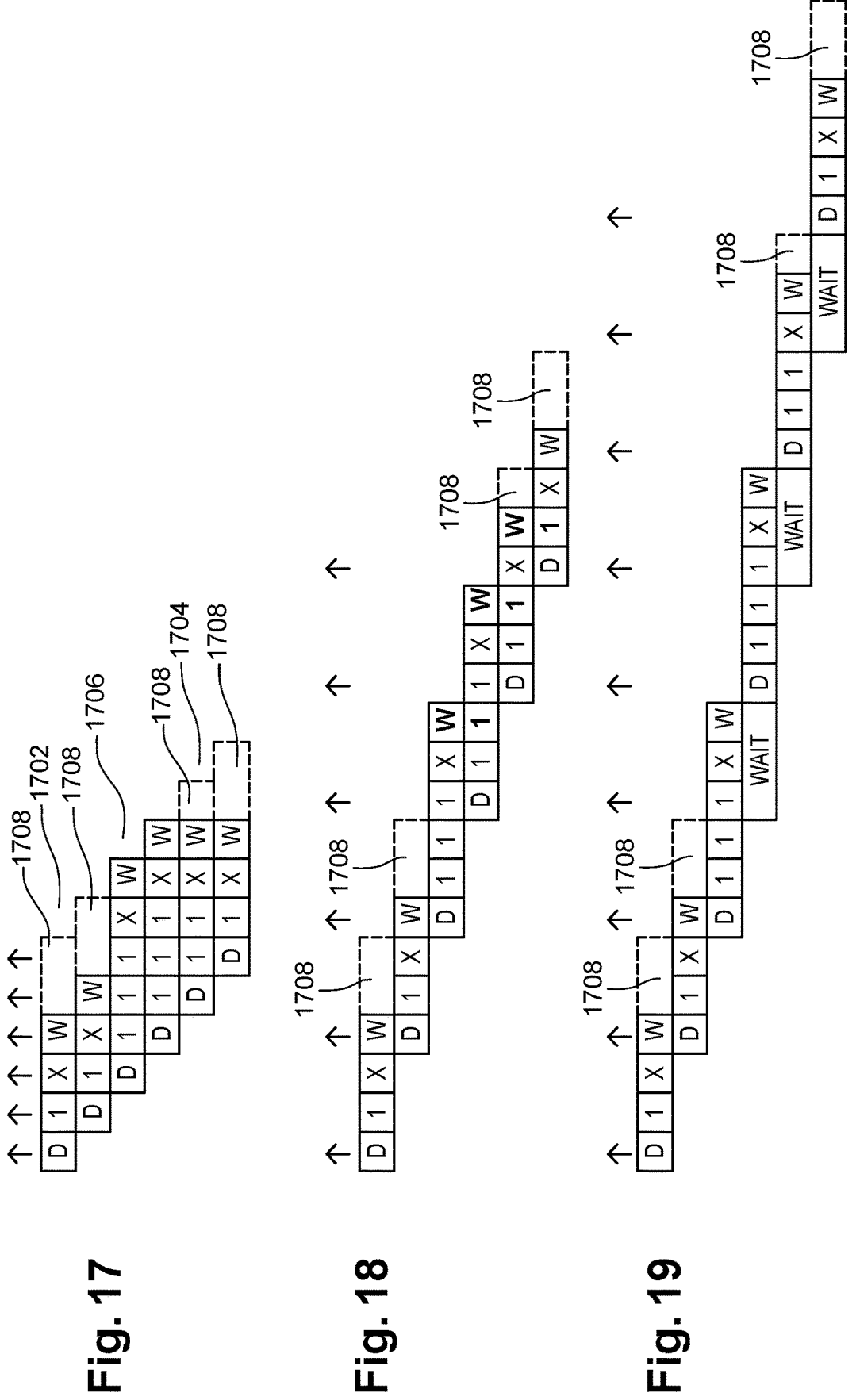
FIG. 17 is a timing diagram illustrating examples of execution, using a C-SRAM solution having 4RW SRAM cells, of a plurality of instruction types each having a different number of operands.
FIG. 18 is a timing diagram illustrating examples of execution, using a C-SRAM solution having 2RW or 1R1W SRAM cells, of a plurality of instruction types each having a different number of operands.
FIG. 19 is a timing diagram illustrating examples of execution, using a C-SRAM solution having 1RW SRAM cells, of a plurality of instruction types each having a different number of operands.

FIGS. 17 to 24 correspond to examples based on the following three instruction types: a short-length instruction based on a single operand corresponding to the pattern "D 1 X W" (see for example the row 1702 of FIG. 17), a middle-length instruction based on two operands corresponding to the pattern "D 1 1 X W" (see for example the row 1704 of FIG. 17), and a long-length instruction based on three operands corresponding to the pattern "D 1 1 1 X W" (see for example the row 1706 of FIG. 17).

Dashed blocks 1708 in FIGS. 17 to 21 represent idle operations inserted following the short and middle-length instructions to bring them to the instruction length of six operations.

Figures 22, 23, 24:
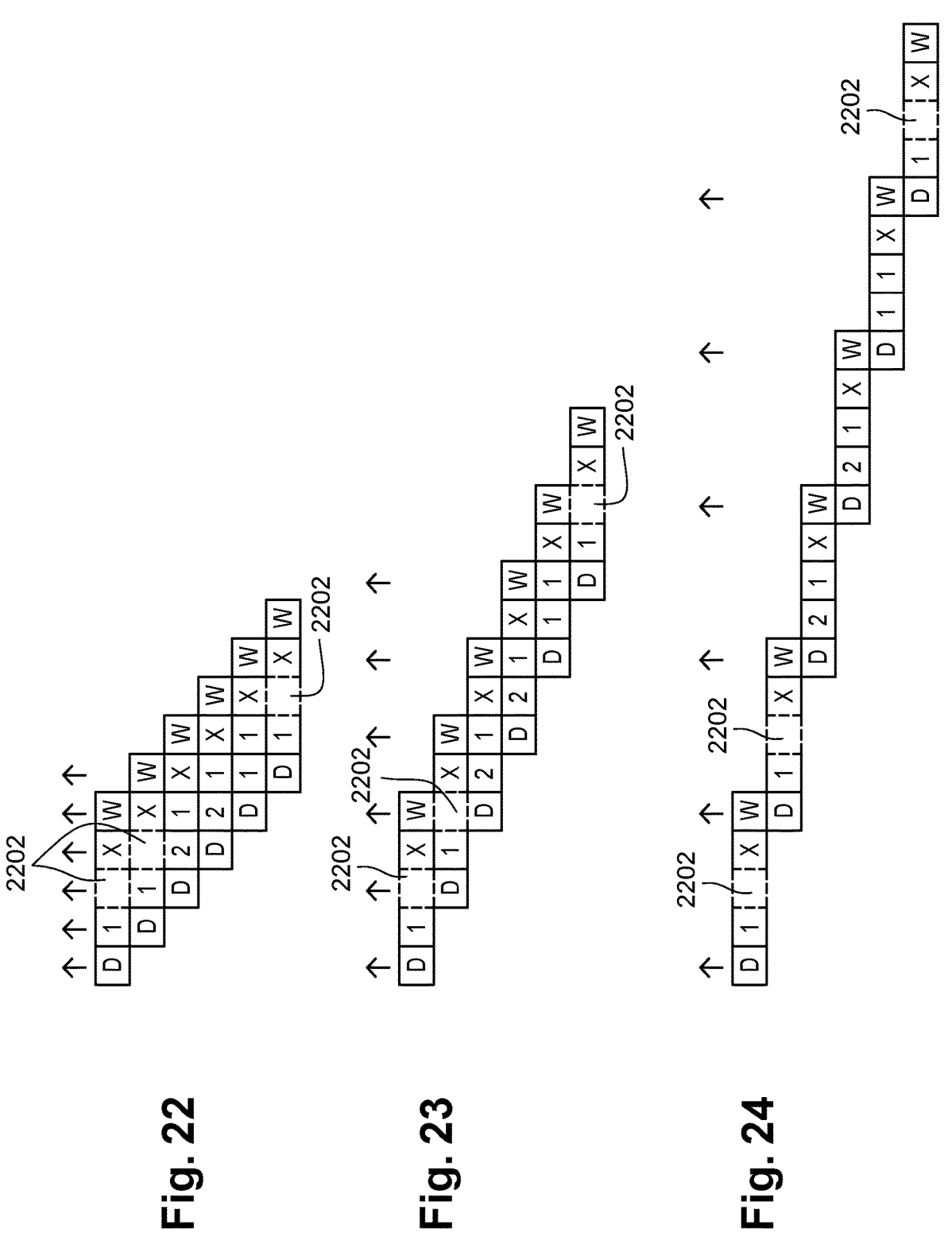
FIG. 22 is a timing diagram illustrating examples of execution, using a C-SRAM solution having 4RW SRAM cells, of a plurality of instruction types each having a different number of operands.
FIG. 23 is a timing diagram illustrating examples of execution, using a C-SRAM solution having 2RW or 1R1RW SRAM cells, of a plurality of instruction types each having a different number of operands.
FIG. 24 is a timing diagram illustrating examples of execution, using a C-SRAM solution having 2RW or 1R1RW SRAM cells, of a plurality of instruction types each having a different number of operands.

Dashed blocks 2202 in FIGS. 22 to 24 represent an idle operation inserted in the single operand instruction to bring it to the instruction length of five operations, like the middle-length and long-length instruction types in these examples.

FIGS. 17 and 18 are based on pipelined implementations in which there is no instruction dependency from one instruction to the next.

FIG. 17 is a timing diagram illustrating examples of execution, using a C-SRAM solution having 4RW SRAM cells, of the three instruction types. In the example of FIG. 17:

$$f_{SRAM} \leq 2 \times f_{inst} \qquad \text{[Math 1]}$$

FIG. 18 is a timing diagram illustrating examples of execution, using a C-SRAM solution having 2RW or 1R1W SRAM cells, of the three instruction types. In the example of FIG. 18:

$$f_{SRAM} = 3 \times f_{inst} \qquad \text{[Math 2]}$$

Figures 20, 21:
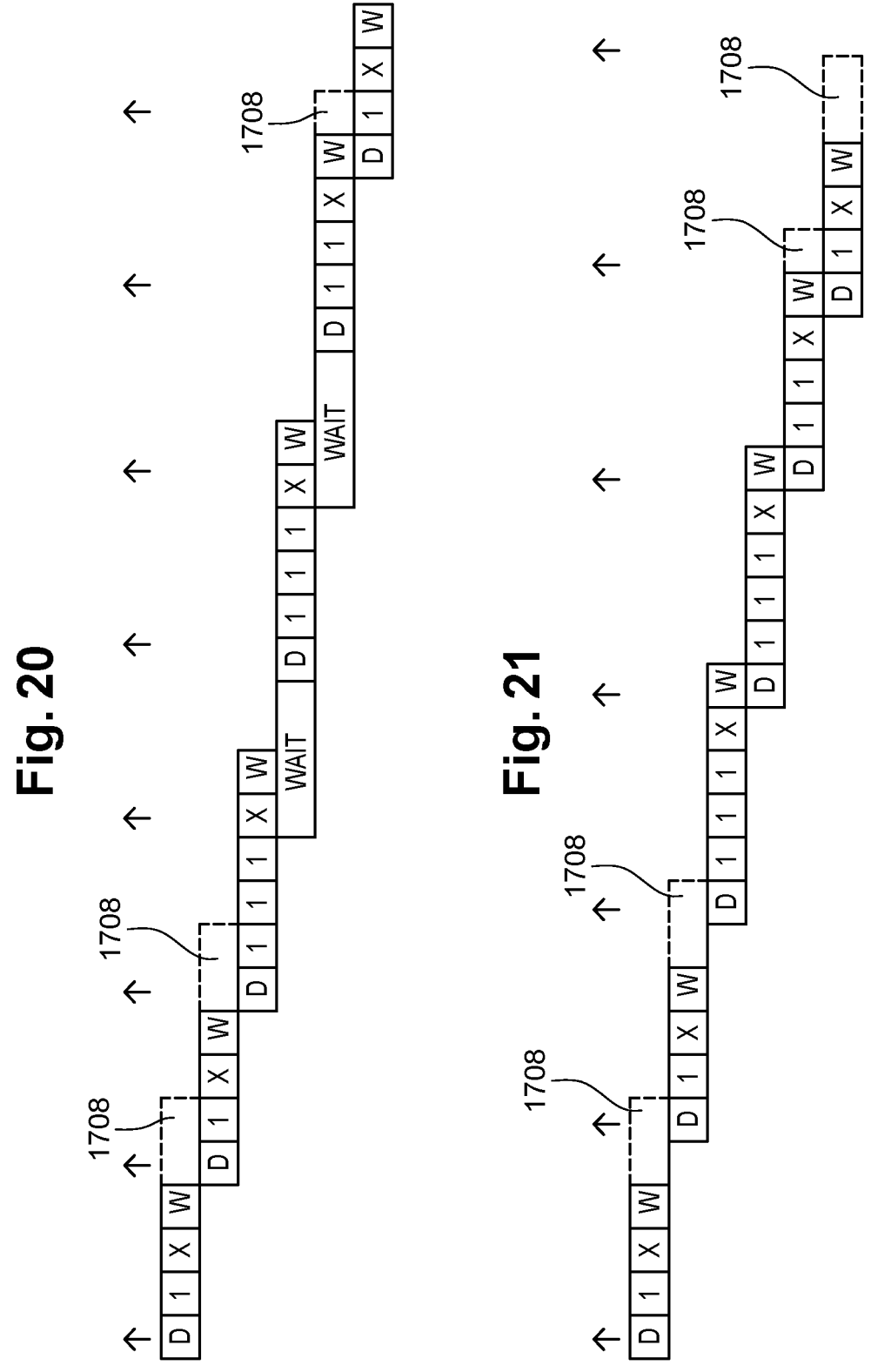
FIG. 20 is a timing diagram illustrating examples of execution, using a C-SRAM solution having 1RW SRAM cells, of a plurality of instruction types each having a different number of operands.
FIG. 21 is a timing diagram illustrating examples of execution, using a C-SRAM solution having 1RW SRAM cells, of a plurality of instruction types each having a different number of operands.

The examples of FIGS. 19 to 21 are based on implementations with an instruction dependency from one instruction to the next. In some embodiments, the presence or absence of instruction dependency is included as a further input during the operation 1305 of FIG. 13.

FIG. 19 is a timing diagram illustrating examples of execution, using a C-SRAM solution having 1RW SRAM cells, of the three instruction types. In this implementation, there is for example an instruction buffer such that, to avoid a read access being performed before a write access of the preceding instruction, a wait (WAIT) cycle is added. In some embodiments, an FSM is used that only starts on cycles that are a multiple of four. In the example of FIG. 19:

$$f_{SRAM}=3\times f_{inst} \qquad \text{[Math 3]}$$

FIG. 20 is a timing diagram illustrating examples of execution, using a C-SRAM solution having 1RW SRAM cells, of the three instruction types. Like in the example of FIG. 19, due to instruction dependency, some wait cycles (WAIT) are added. In some embodiments, an FSM is used that only starts on cycles that are a multiple of five. In the example of FIG. 20:

$$f_{SRAM}=4\times f_{inst} \qquad \text{[Math 4]}$$

FIG. 21 is a timing diagram illustrating examples of execution, using a C-SRAM solution having 1RW SRAM cells, of the three instruction types. In the example of FIG. 21, the value of N is sufficiently high that no wait cycles are used. In some embodiments, an FSM is used that only starts on cycles that are a multiple of six. In the example of FIG. 21:

$$f_{SRAM}\geq 5\times f_{inst} \qquad \text{[Math 5]}$$

FIGS. 22 to 24 correspond to examples in which two read operations can be performed at once, and thus each of the instruction types is reduced by one operation period.

FIGS. 22 and 23 are based on pipelined implementations in which there is no instruction dependency from one instruction to the next.

FIG. 22 is a timing diagram illustrating examples of execution, using a C-SRAM solution having 4RW SRAM cells, of the three instruction types. In the implementation of FIG. 22, a five-stage pipeline is for example used. In the example of FIG. 22:

$$f_{SRAM}=f_{inst} \qquad \text{[Math 6]}$$

FIG. 23 is a timing diagram illustrating examples of execution, using a C-SRAM solution having 2RW or 1R1RW SRAM cells, of the three instruction types. In some embodiments, an FSM is used that only starts on cycles that are a multiple of two. In the example of FIG. 21:

$$2\times f_{inst}\leq f_{SRAM}\leq 3\times f_{inst} \qquad \text{[Math 7]}$$

Indeed, implementations based on a 2RW or a 1R1RW SRAM cell are for example possible with N equal to 2 or 3.

FIG. 24 is a timing diagram illustrating examples of execution, using a C-SRAM solution having 2RW or 1R1RW SRAM cells, of the three instruction types. In the example of FIG. 24, instruction dependency is assumed, and no pipeline is used. In some embodiments, an FSM is used that only starts on cycles that are a multiple of five. In the example of FIG. 24:

$$f_{SRAM}\leq 5\times f_{inst} \qquad \text{[Math 8]}$$

It can be shown that, in the examples of FIGS. 17, 18 and 21 to 24, the number of operations that can be performed during each instruction cycle is the same irrespective of the distribution between short, middle and long-length instructions. However, in the examples of FIGS. 19 and 20, there is a dependency.

For example, it can be shown that, in the example of FIG. 19 with N=3, a gain is possible with respect to the example of FIG. 21 under certain conditions concerning the distribution of short, middle and long instructions, such as if the number of short instructions represent on average at least 33 percent of instructions.

As another example, it can be shown that, in the example of FIG. 20 with N=4, a gain is possible with respect to the example of FIG. 21 under certain conditions concerning the distribution of short, middle and long instructions, such as if the number of short and middle instructions represent on average at least 75 percent of instructions, and/or if there are more middle than short instructions.

Therefore, in some embodiments, the indication of the instructions provided as the input 1301 of FIG. 13 includes an indication of the distribution among the instruction types, such as the average percentage of occurrences for each instruction type if there are a plurality of different instruction lengths. As shown above, for some SRAM types, only the worst-case instruction length is considered, i.e. the longest instruction length, while for other SRAM types, the particular distribution is also taken into account. For example, the non-volatile memory 1108 of FIG. 11 stores an indication, for each SRAM type, for a plurality of different instruction lengths, and/or for a plurality of different instruction occurrence distributions, the corresponding value of N that can be achieved. This information is for example provided in the form of a look up table (LUT).

The evaluation of the number N representing the average number of cycles of the computational memory circuit per instruction cycle based on a fixed, worst-case instruction length or based on a maximum number of memory access cycles per instruction, will now be described in more detail with reference to FIGS. 25 to 32.

In FIGS. 25 and 28 to 32, the character "D" designates an instruction decoding operation, the character "R" designates a read access from SRAM, the character "B" designates an idle bubble of one or more cycles during which no operation is performed, the character "X" designate a function applied to one or two operands, with the result stored to a local register, the characters "1/X" designates a function applied to one or two operands, at least one of which is from a local register, and the character "W" designates a write operation of the result back to the SRAM.

Figures 25, 26:
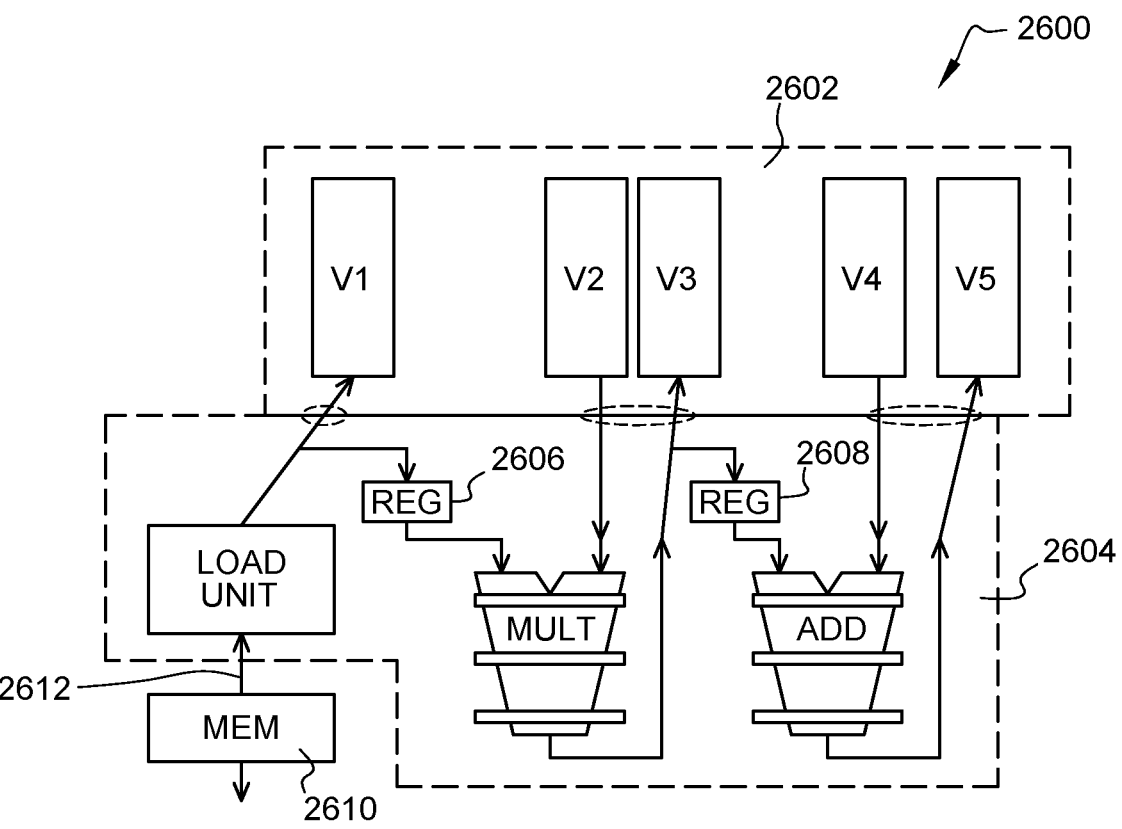
FIG. 25 illustrates an example of five C-SRAM instructions forming an instruction set according to an example embodiment of the present disclosure.
FIG. 26 schematically illustrates a C-SRAM configured for vector chaining according to an example embodiment.

FIG. 25 illustrates an example of five C-SRAM instructions forming an instruction set of a computational memory circuit, such as the circuit 106 of FIG. 1 or the circuit of FIG. 26 described below. All of the instructions of the instruction set are for example configured to have a same instruction length, in other words to be executed over a same number of cycles of the computational memory circuit. For at least some of the instructions of the instruction set, this is achieved by adding one or more idle cycles, or bubbles B, to the instruction. For example, the fixed instruction length, equal to six cycles in the example of FIG. 25, is equal to the number of cycles of the longest instruction of the instruction set. In particular, all instructions, irrespective of the number of operands, are for example adapted to be executed over this fixed number of cycles by inserting the bubbles B of one or more cycles in certain instructions. In the example of FIG. 25, an instruction set includes five instructions 2501 to 2505, and the worst-case (longest) prior to the bubble insertion is the instruction 2505, which thus has no inserted bubbles. Of course, in alternative embodiments, the instructions of the instruction set could be configured to have a fixed length different to that of the example of FIG. 25, if for example the worst-case instruction length is not equal to six cycles.

The instruction 2505 has three operands, one of which is stored in a local register of the processor. This instruction is for example a MAC instruction, although it could be another type of instruction. The instruction 2505 is executed over six cycles, corresponding to a decode D cycle, followed by two read cycles R of two operands, followed by an operation X on the two operands, followed by an operation 1/X on an operand stored in a local register, followed by a write operation W of the result.

The other instructions 2501 to 2504 each involve just one or two operands, and each have one, two or three bubbles B corresponding to idle cycles.

Instruction 2501 has one operand, and for example comprises, in order over the six cycles, a decode operation D, a read operation R, a bubble B of two cycles, an execute operation X on the read operand, and a write operation W of the result.

Instruction 2502 has one operand, and for example comprises, in order over the six cycles, a decode operation D, a bubble B of three cycles, an execute operation 1/X on an operand stored in a local register, and a write operation W of the result.

Instruction 2503 has two operands, and for example comprises, in order over the six cycles, a decode operation D, two read operations R of the two operands, a bubble B of one cycle, an execute operation X on the read operands, and a write operation W of the result.

Instruction 2504 has two operands, and for example comprises, in order over the six cycles, a decode operation D, a read operation R of one operand, a bubble B of two cycles, an execute operation 1/X on at least one operand stored in a local register, and a write operation W of the result.

The example of FIG. 25 can be applied in a broad range of applications in which there are a maximum of three operands. Indeed, it is very common for instructions to be limited to processing at most two operands read from memory and one further operand stored in a register. For example, it could be applied to the instruction set formed of some or all of the instructions of Table 1 above, in which all of the operations have a same instruction length equal for example to six cycles. However, it will be apparent to those skilled in the art that similar worst-case instruction sets could be derived based on a different maximum numbers of operands, such as a maximum of four or five operands.

FIG. 26 schematically illustrates a C-SRAM 2600 configured for vector chaining according to an example embodiment, and illustrates in particular local registers (REG) that can store operands and thereby avoid some SRAM read operations. For example, the C-SRAM 2600 comprises an SRAM portion 2602 and a digital wrapper 2604.

The digital wrapper 2604 for example comprising a data processing circuit for performing data processing operations. For example, the data processing circuit is formed of one or more arithmetic units that together form an ALU (Arithmetic Logic Unit). In the example of FIG. 26, there are two such units, a multiplier (MULT) and an adder (ADD), although in alternative embodiments there could be a different number of units, and/or other functions could be implemented by one or both of the units, such as subtract, increment, decrement, shift, etc. The digital wrapper 2604 also for example comprises a load unit (LOAD UNIT), configured for example to load data values from a memory (MEM) 2610 via a system bus 2612. The memory 2610 is for example a non-volatile memory, such as a FLASH memory. Alternatively, the digital wrapper 2604 is coupled to the system bus via the memory 2610, and the memory 2610 acts as a buffer for the C-SRAM 2600.

In the example of FIG. 26, data values V1, V2 and V4 have been loaded to the SRAM 2602. The data value V1 is also passed to a local register (REG) 2606, from where it can be applied directly to one input of the multiplier MULT. The data value V2 is provided to the second input of the multiplier MULT. The result of the multiplication is for example stored as a value V3 in the SRAM 2602, and is also passed to a local register (REG) 2608, from where it can be applied directly to one input of the adder ADD. The data value V4 is provided to the second input of the adder ADD. The result of the addition is for example stored as a value V5 in the SRAM 2602 in a final write operation. Thus, the registers 2606 and 2608 permit a reduction in the number of SRAM read and write operations. Alternatively, the result of the multiplication could be written only to the SRAM 2602, or only to the register 2608.

Figures 27, 28, 29:
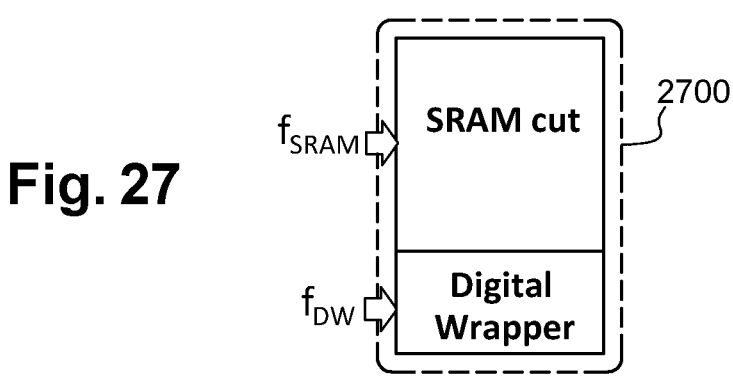
FIG. 27 schematically illustrates frequency domains of a C-SRAM according to an example embodiment.
FIG. 28 is a timing diagram illustrating an example of pipelined execution of instructions having a fixed instruction length using C-SRAM solutions having 1RW SRAM cells.
FIG. 29 is a timing diagram illustrating an example of pipelined execution of instructions having a fixed instruction length using C-SRAM solutions having 2RW, 1R1W or 1R1RW SRAM cells.

FIG. 27 schematically illustrates frequency domains of a C-SRAM 2700, which is for example the circuit 106 of FIG. 1 or the circuit 2600 of FIG. 26. The SRAM portion (SRAM cut) operates at a frequency of $f_{SRAM}$, and the digital wrapper (Digital Wrapper) operates at a frequency $f_{DW}$, corresponding for example to the instruction frequency $f_{inst}$.

FIGS. 28 to 32 are timing diagrams illustrating various examples of pipelined execution of fixed instruction lengths according to the example of FIG. 25. In particular, the examples are based on a series of five instructions corresponding to two of the instructions 2502 followed by three of the instructions 2505. These timing diagrams are based on using C-SRAM solutions with different types of SRAM cells. Thus, each instruction is executed by a decode operation (Decode), first and second read operations (Fetch-1, Fetch-2), first and second execute operations (Execute-1, Execute-2) and a write operation (Write-Back).

FIG. 28 illustrates the case of 1RW SRAM cells. There are at most two read accesses and one write access during a single instruction cycle, and therefore the 1RW cell implies a minimum ratio between the frequencies $f_{SRAM}$ and $f_{DW}$ is three to one, in other words $f_{SRAM}=3*f_{DW}$.

FIG. 29 illustrates the case of a 2RW, 1R1W or 1R1RW SRAM cell. In this case, the two read accesses and one write access can be performed over two memory cycles, and therefore a minimum ratio between the frequencies $f_{SRAM}$ and $f_{DW}$ is two to one, in other words $f_{SRAM}=2*f_{DW}$.

FIG. 30 illustrates the case of a 2R1W SRAM cell. In this case, the two read accesses and one write access can be performed in a single memory cycle, and therefore a minimum ratio between the frequencies $f_{SRAM}$ and $f_{DW}$ is one to one, in other words $f_{SRAM}=f_{DW}$.

FIG. 31 illustrates the case of 1RW SRAM cells, but for a case in which, after four consecutive instructions, an empty instruction cycle (WAIT) is inserted. This avoids the case of more than two memory accesses during a single instruction cycle. Thus, there are at most two read accesses, or one read and one write access, during a single instruction cycle, and therefore the 1RW cell implies a minimum ratio between the frequencies $f_{SRAM}$ and $f_{DW}$ is two to one, in other words $f_{SRAM}=2*f_{DW}$. In this example, only one of the instructions includes a write cycle to the SRAM, as results of other computations are for example written to a local register.

FIG. 32 illustrates the case of a 2RW or 1R1RW SRAM cell, but for a case in which, after four consecutive instructions, an empty instruction cycle (WAIT) is inserted. This avoids the case of more than two memory accesses during a single instruction cycle. Thus, there are at most two read accesses, or one read and one write access, during a single instruction cycle, and therefore a minimum ratio between the frequencies $f_{SRAM}$ and $f_{DW}$ is one to one, in other words $f_{SRAM}=f_{DW}$. Again, in this example, only one of the instructions includes a write cycle to the SRAM, as results of other computations are for example written to a local register.

With reference again to FIG. 13, in an operation 1306, a maximum operating frequency $f_{SRAM\_max}$ of the computation SRAM is for example determined. This is for example a function of the type of SRAM, the total SRAM size, as the greater the size, the lower the maximum frequency, and the number of cuts, as the greater the number of cuts, the higher the maximum frequency. In some embodiments, the determined maximum C-SRAM operating frequency $f_{SRAM\_max}$ is then for example compared to the minimum C-SRAM frequency $f_{SRAM\_min}$ calculated for the candidate memory cell type. If:

$$f_{SRAM\_max} \geq f_{SRAM\_min} \qquad \text{[Math 9]}$$

then the candidate SRAM cell type is for example chosen as a potential candidate. Otherwise, in an operation 1307, it is determined whether the number of cuts is equal to or greater than a threshold, and if not, the operation 1306 is repeated after increasing by one the number of cuts in an operation 1308. In the example of FIG. 13, the threshold for the number of cuts is 16, in other words a cut will only be added if the number of cuts is lower than 16.

Once all numbers of cuts up to the threshold have been evaluated, in an operation 1309, it is determined whether there are further SRAM types not yet considered. If so, the method returns to operation 1304.

Alternatively, once all candidate SRAM cell types have been considered, in an operation 1310, an SRAM type is for example selected among the identified candidates. For example, a best candidate is selected based on one or more selection criteria, such as the candidate providing the lowest surface area, the lowest energy consumption, and/or, in the case of a pre-selection phase during which the instruction frequency is not fixed at the input (see below), the fastest operating frequency. Other parameters may also be considered, such as whether or not redundancy, e.g. ECC (Error Correcting Code) is to be implemented in the memory, which may impact surface area and frequency.

While FIG. 13 illustrates an example in which the user provides, as one of the inputs, the instruction frequency $f_{inst}$, in alternative embodiments the instruction frequency is not defined, and operation 1306 involves also determining a maximum instruction frequency $f_{inst\_max}$ based on N and on the maximum C-SRAM frequency. For example, in some embodiments the method of FIG. 13 is performed twice, a first time corresponding to a pre-selection phase in which the maximum instruction frequency $f_{inst\_max}$ is determined for each candidate memory cell in order to generate a restricted list of candidate memory cells, and a second time corresponding to a selection phase of one of the candidates as described above. For example, during the pre-selection phase, $f_{inst\_max}$ is calculated as:

$$f_{inst\_max} = f_{SRAM\_max}/N$$

In such a case, the selection of the SRAM type in operation 1310 may also be based on the determined frequency $f_{inst\_max}$.

An advantage of the embodiments described herein is that, during circuit conception, a computational memory solution can be selected among candidates identified as feasible for the instruction type or instruction types to be executed.

Various embodiments and variants have been described. Those skilled in the art will understand that certain features of these embodiments can be combined and other variants will readily occur to those skilled in the art. For example, while embodiments have been described based on a number of different SRAM types, it will be apparent to those skilled in the art that the principles described herein could be applied to other memory types, and also to the conception of any type of computational memory circuit, be it based on an IMC or NMC architecture, or on another type of architecture.

The invention claimed is:

1. A method of performing automated circuit design of a computational memory circuit comprising a memory having memory cells, the method comprising:

receiving, by a computing device, an indication of a memory storage size of the memory of the computational memory circuit and an indication of an instruction frequency of the instructions to be executed by the computational memory circuit;

performing a pre-selection of a plurality of candidate types of memory cells from an initial set of candidate types of memory cells based on determining a maximum instruction frequency for each of the initial set of candidate types of memory cells;

evaluating, by the computing device for each of the plurality of candidate types of memory cells for implementing the memory cells of the memory of the computational memory circuit, a corresponding first number representing, for the candidate type of memory cells, an average number of cycles of the computational memory circuit per instruction to be executed by the computational memory circuit, wherein each of the candidate types of memory cells differs from the other candidate types of memory cells in terms of a number of read and/or write operations capable of being performed during a memory access cycle;

determining, by the computing device, for each of the plurality of candidate types of memory cells, a corresponding minimum operating frequency of the memory of the computational memory circuit based on the first number (N) for each of the candidate types of memory cells;

selecting one of the plurality of candidate types of memory cells based on the determined minimum operating frequencies for the candidate types of memory cells; and performing, by the computing device, the circuit design based on the selected type of candidate memory cell, wherein performing the circuit conception based on the selected type of candidate memory cell comprises generating, by the computing device, for the selected type of candidate memory cell, one or more digital design files used to obtain an implementation of the computational memory circuit having memory cells of the selected type and one or more processing elements for implementing the at least one operation.

2. The method of claim 1, further comprising, prior to selecting one of the candidate types:

determining, by the computing device for each of the plurality of candidate types of memory cells, and for example using a look-up table, a maximum operating frequency of the computational memory circuit, wherein selecting one of the candidate types comprises:

selecting, by the computing device, one of the plurality of candidate types of memory cells for which the maximum operating frequency is greater than the minimum operating frequency of the computational memory circuit.

3. The method of claim 2, wherein the computing device is configured to calculate the minimum operating frequency $f_{SRAM\_min}$ based on the following formula:

$$f_{SRAM\_min}=N*f_{inst}$$

where $f_{inst}$ is the indication of the instruction frequency and N is said first number.

4. The method of claim 2, wherein selecting, by the computing device, one of the plurality of candidate types of memory cells is further based on a determination of the highest performing candidate memory cell, among the plurality of candidate types of memory cells, in terms of operating frequency of the computational memory circuit, surface area of the computational memory circuit and/or power consumption of the computational memory circuit.

5. The method of claim 1, wherein the performing the pre-selection of the plurality of candidate types of memory cells from the initial set of candidate types of memory cells comprises:

determining, by the computing device for each candidate type of the initial set of candidate types of memory cells, a maximum operating frequency of the computational memory circuit;

evaluating, by the computing device for each candidate type of the initial set, the first number representing the average number of cycles of the computational memory circuit per instruction to be executed by the computational memory circuit;

determining, by the computing device, for each candidate type of the initial set, a maximum instruction frequency of the computational memory circuit based on the first number (N) and on the memory storage size; and selecting, by the computing device, the plurality of candidate types from the initial set based on the determined maximum instruction frequencies.

6. The method of claim 5, wherein the computing device is configured to calculate the maximum instruction frequency $f_{inst\_max}$ based on the following formula:

$$f_{inst\_max}=f_{SRAM\_max}/N$$

where $f_{SRAM\_max}$ is the maximum operating frequency and N is said first number.

7. The method of claim 2, wherein the maximum operating frequency is determined by the computing device based on one or more of: the type of the candidate memory cells; the memory storage size; and a number of cuts forming the computational memory circuit.

8. The method of claim 1, wherein the first number (N) is evaluated based on a highest instruction length among instructions of an instruction set to be executed by the computational memory circuit.

9. The method of claim 8, wherein the instruction set consists of instructions having a fixed length equal to said highest instruction length defined, for example, by a 3-operand operation.

10. The method of claim 1, wherein the first number (N) is evaluated based on an indication of at least one instruction type to be executed by the computational memory circuit, and/or on an indication of a number and type of operations of each instruction type to be executed by the computational memory circuit.

11. The method of claim 10, wherein the first number (N) is further evaluated based on an indication of a relative occurrence distribution of each instruction type to be executed by the computational memory circuit.

12. The method of claim 1, wherein the plurality of candidate types of memory cells comprises at least some or all of the following static random access memory cell types:

a 1RW cell type in which at most a single read or write operation can be performed during each memory access cycle;

a 1R1W cell type in which at most a single read operation and a single write operation can be performed during each memory access cycle;

a 1R1RW cell type in which at most a single read operation and either a single further read operation, or a single write operation, can be performed during each memory access cycle;

a 2RW cell type in which at most two operations, each of which is either a read or write, can be performed during each memory access cycle;

a 2R1W cell type in which at most two read operations and a single write operation can be performed during each memory access cycle;

a 2R2W cell type in which at most two read operations and two write operations can be performed during each memory access cycle;

a 2R2RW cell type in which at most two read operations and two further operations, each of which is either a read or a write, can be performed during each memory access cycle; and a 4RW cell type in which at most four operations, each of which is either a read or a write, can be performed during each memory access cycle.

13. The method of claim 1, wherein the first number (N) is evaluated as being:

equal to 3 for a first class of the candidate types of memory cells capable of performing a single read or write operation during each memory access cycle;

equal to 2 for a second class of the candidate types of memory cells capable of performing more than a single read or write operation, and up to two read or write operations, during each memory access cycle; and equal to 1 for a third class of the candidate types of memory cells capable of performing two read operations and a single write operation during each memory access cycle.

14. A method of conception and fabrication of a computational memory circuit comprising:

the conception of the computational memory circuit according to claim 1; and the fabrication of the computational memory circuit based on the one or more digital design files.

15. A computing device for automated circuit design of a computational memory circuit comprising a memory having memory cells, the computing device comprising one or more processors under control of instructions stored in an instruction memory, the computing device being configured to:

receive an indication of a memory storage size of the memory of the computational memory circuit and an indication of an instruction frequency of the instructions to be executed by the computational memory circuit;

perform a pre-selection of a plurality of candidate types of memory cells from an initial set of candidate types of memory cells based on determining a maximum instruction frequency for each of the initial set of candidate types of memory cells;

evaluate, for each of the plurality of candidate types of memory cells for implementing the memory cells of the memory of the computational memory circuit, a corresponding first number representing, for the candidate type of memory cells, an average number of cycles of the computational memory circuit per instruction to be executed by the computational memory circuit, wherein each of the candidate types of memory cells differs from the other candidate types of memory cells in terms of a number of read and/or write operations capable of being performed during a memory access cycle;

determine, for each of the plurality of candidate types of memory cells, a corresponding minimum operating frequency based on the first number (N) for each of the candidate types of memory cells;

select one of the plurality of candidate types of memory cells based on the determined minimum operating frequency value; and perform the circuit design based on the selected type of candidate memory cell, comprising generating, by the computing device, for the selected type of candidate memory cell, one or more digital design files used to implement the computational memory circuit having memory cells of the selected type and one or more processing elements for implementing the at least one operation.

\* \* \* \* \*